(12) United States Patent
Ramzan et al.

(10) Patent No.: US 7,747,857 B2
(45) Date of Patent: Jun. 29, 2010

(54) USE OF MODULAR ROOTS TO PERFORM AUTHENTICATION INCLUDING, BUT NOT LIMITED TO, AUTHENTICATION OF VALIDITY OF DIGITAL CERTIFICATES

(75) Inventors: Zulfikar Amin Ramzan, San Mateo, CA (US); Craig B. Gentry, Mountain View, CA (US); Bernhard Bruhn, Stuttgart (DE)

(73) Assignee: NTT DoCoMo, Inc., Tokyo (JP)

( * ) Notice: Subject to any disclaimer, the term of this patent is extended or adjusted under 35 U.S.C. 154(b) by 1042 days.

(21) Appl. No.: 11/454,394

(22) Filed: Jun. 16, 2006

(65) Prior Publication Data
US 2006/0242699 A1 Oct. 26, 2006

Related U.S. Application Data

(62) Division of application No. 11/304,200, filed on Dec. 15, 2005, now Pat. No. 7,266,692.

(60) Provisional application No. 60/637,177, filed on Dec. 17, 2004.

(51) Int. Cl.
*H04L 9/32* (2006.01)
(52) U.S. Cl. .............................. 713/168; 726/2; 726/21
(58) Field of Classification Search .................. 726/21, 726/2; 713/168
See application file for complete search history.

(56) References Cited

U.S. PATENT DOCUMENTS 4,914,698 A 4/1990 Chaum (Continued)

FOREIGN PATENT DOCUMENTS

WO WO2005/002944 3/2005

OTHER PUBLICATIONS

W. Aiello, S. Lodha, and R. Ostrovsky. Fast digital identity revocation. In *Proc. of CRYPTO '98*, 1998.

(Continued)

*Primary Examiner*—Michael Pyzocha
(74) *Attorney, Agent, or Firm*—Haynes and Boone LLP; Michael Shenker

(57) ABSTRACT

Authentication of elements (e.g. digital certificates 140) as possessing a pre-specified property (e.g. being valid) or not possessing the property is performed by (1) assigning a distinct integer $p_i$ to each element, and (2) accumulating the elements possessing the property or the elements not possessing the property using a P-th root $u^{1/P}$ (mod n) of an integer u modulo a predefined composite integer n, where P is the product of the integers associated with the accumulated elements. Alternatively, authentication is performed without such accumulators but using witnesses associated with such accumulators. The witnesses are used to derive encryption and/or decryption keys for encrypting the data evidencing possession of the property for multiple periods of time. The encrypted data are distributed in advance. For each period of time, decryption keys are released which are associated with that period and with the elements to be authenticated in that period of time. Authentication can be performed by accumulating elements into data which are a function of each element but whose size does not depend on the number of elements, and transmitting the accumulator data over a network to a computer system which de-accumulates some elements as needed to re-transmit only data associated with elements needed by other computer systems. This technique is suitable to facilitate distribution of accumulator data in networks such as ad hoc networks.

8 Claims, 5 Drawing Sheets

U.S. PATENT DOCUMENTS

| | | | |
|---|---|---|---|
| 5,140,634 A * | 8/1992 | Guillou et al. ............... | 713/180 |
| 5,666,416 A | 9/1997 | Micali | |
| 5,687,235 A | 11/1997 | Perlman | |
| 5,699,431 A | 12/1997 | Van Oorschot | |
| 5,717,757 A | 2/1998 | Micali | |
| 5,717,758 A | 2/1998 | Micali | |
| 5,793,868 A | 8/1998 | Micali | |
| 5,903,651 A | 5/1999 | Kocher | |
| 5,960,083 A | 9/1999 | Micali | |
| 5,982,892 A * | 11/1999 | Hicks et al. .................... | 705/51 |
| 6,044,462 A | 3/2000 | Zubeldia | |
| 6,097,811 A | 8/2000 | Micali | |
| 6,128,740 A | 10/2000 | Curry | |
| 6,226,743 B1 | 5/2001 | Naor et al. | |
| 6,292,893 B1 | 9/2001 | Micali | |
| 6,301,659 B1 | 10/2001 | Micali | |
| 6,442,689 B1 | 8/2002 | Kocher | |
| 6,487,658 B1 | 11/2002 | Micali | |
| 6,532,540 B1 | 3/2003 | Kocher | |
| 6,766,450 B2 | 7/2004 | Micali | |
| 2002/0046337 A1 | 4/2002 | Micali | |
| 2002/0165824 A1 | 11/2002 | Micali | |
| 2003/0177352 A1 | 9/2003 | Camenisch et al. | |
| 2003/0217265 A1 | 11/2003 | Nakano et al. | |
| 2003/0221101 A1 | 11/2003 | Micali | |
| 2003/0236976 A1 | 12/2003 | Wheeler | |
| 2004/0049675 A1 | 3/2004 | Micali | |
| 2004/0128504 A1 | 7/2004 | Kivinen | |
| 2005/0053045 A1 | 3/2005 | Chmora | |
| 2005/0055548 A1 | 3/2005 | Micali | |
| 2005/0081037 A1 | 4/2005 | Kumagai | |

OTHER PUBLICATIONS

G. Ateniese, J. Camenisch, M. Joye, and G. Tsudik. A Practical and Provably Secure Coalition-Resistant Group Signature Scheme. In *Proceedings of CRYPTO 2000*, 2000.

M. Bellare and P. Rogaway. Random oracles are practical: A paradigm for designing efficient protocols. In *Proc. First Annual Conference on Computer and Communications Security*, ACM, 1993.

D. Boneh, B. Lynn, and H. Shacham. Short signatures from the Weil pairing. In *Proceedings of Asiacrypt '01*, 2001.

F. Elwailly and Z. Ramzan. QuasiModo: More Efficient Hash Tree-Based Certificate Revocation. Manuscript, 2003.

I. Gassko, P. S. Gemmell, and P. MacKenzie. Efficient and fresh certification. In Proceedings of PKC 2000, 2000.

S. Goldwasser, S. Micali, and R. L. Rivest. A Digital Signature Scheme Secure Against Adaptive Chosen-Message Attacks. SIAM Journal on Computing, 17(2):281-308, 1988.

Y-C. Hu, A. Perrig, and D. Johnson. Efficient security mechanisms for routing protocols. In proceedings of the 10th Annual Network and Distributed System Security Symposium (NDSS), 2003.

M. Jakobsson, J-P.Hubaux, and L. Buttyan. A micropayment scheme encouraging collaboration in multi-hop cellular networks. In *Proceedings of the 7th International Conference on Financial Cryptography*, 2003.

M. Jakobsson, T. Leighton, S. Micali, and M. Szydlo. Fractal merkle tree representation and traversal. In *Proceedings of the Cryptographer's Track*, RSA Conference, 2003.

S. Jarecki and A. Odlyzko. An efficient micropayment system based on probabilistic polling. In *Proceedings of the 1st International Conference on Financial Cryptography*, 1997.

Robert Johnson, David Molnar, Dawn Xiaodong Song, and David Wagner. Homomorphic signature schemes. In CT-RSA, pp. 244-262, 2002.

C. Jutla and M. Yung. PayTree: Amortized signatures for flexible micropayments. In *Proceedings of the second USENIX workshop on electronic commerce*, 1996.

S. Kim and H. Oh. An atomic micropayment system for a mobile computing environment. *IEICE Transactions of Information and Systems*, E84-D(6):709-716, 2001.

P. Kocher. On Certificate Revocation and Validation. In *Proceedings of the 2nd International Conference on Financial Cryptography*, 1998.

S. Micali. Efficient Certificate Revocation. MIT/LCS/TM 542b, Massachusetts Institute of Technology, 1996.

R. J. Lipton and R. Ostrovsky. Micro-Payments via Efficient Coin Flipping. In *Proceedings of the 2nd International Conference on Financial Cryptography*, 1998.

A. Malpani, R. Housely, and T. Freeman. Simple Certificate Validation Protocol—(SCVP). In *IEFT Draft—draft-ietf-pkix-scvp-12.txt*, Jun. 2003.

S. Micali. Efficient Certificate Revocation. In *Proceedings of the RSA Data Security Conference*, 1997. Also U.S. Patent No. 5,666,416.

S. Micali. NOVOMODO: scalable certificate validation and simplified PKI management. In *Proceedings of the 1st Annual PKI Research Workshop*, 2002.

M. Myers, R. Ankney, A. Malpani, S. Galperin, and C. Adams. X.509 internet public key infrastructure Online Certificate Status Protocol—OCSP. In *Internet RFC 2560*, Jun. 1999.

M. Naor and K. Nissim. Certificate Revocation and Certificate Update. In *Proceedings of USENIX Security*, 1998.

National Bureau of Standards. NBS FIPS PUB 81: DES modes of operation. 1980.

National Institute of Standards. FIPS 180-1: Secure hash standard. 1995.

M. Pierce and D. O'Mahony. Micropayments for Mobile Networks. In *Proceedings of European Wireless*, 1999. Winner of Best Paper Award.

R.L. Rivest. The MD5 message digest algorithm. In *Internet RFC 1321*, Apr. 1992.

R.L. Rivest. Electronic Lottery Tickets as Micropayments. In *Proceedings of the 2nd International Conference on Financial Cryptography*, 1997.

R.L. Rivest and A. Shamir. PayWord and MicroMint—Two Simple Micropayment Schemes. *CryptoBytes (RSA Laboratories)*, 2(1), 1996. Proceedings of 1996 International Workshop on Security Protocols.

R.L. Rivest, A. Shamir, and L. Adleman. A Method for Obtaining Digital Signatures and Public-Key Cryptosystems. *Communications of the ACM*, 21:120-126, 1978.

Ron Steinfeld, Laurence Bull, and Yuliang Zheng. Content extraction signatures. In *Proceedings of the 4th International Conference Seoul on Information Security and Cryptology*, pp. 285-304. Springer-Verlag, 2002.

H. Tewari and D. O'Mahony. Multiparty Micropayments for Ad-Hoc Networks. In *Proceedings of the IEEE Wireless Communications and Networking Conference (WCNC)*, 2003.

H. Tewari and D. O'Mahony. Real-Time Payments for Mobile IP. *IEEE Communications*, 41(2):126-136, 2003.

D. Wheeler. Transactions Using Bets. In *Proceedings of Fourth Cambridge Workshop on Security Protocols*, 1996.

J. Zhou and K-Y. Lam. Undeniable Billing in Mobile Communication. In *Proceedings of MOBICOM*, 1998.

A. Savvides, W. L. Garber, R. L. Moses, and M.B. Srivastava. An Analysis of Error Including Parameters in Multihop Sensor Node Localization. IEEE Transactions on Mobile Computing, vol. 4, No. 6, Nov./Dec. 2005.

J. C. Jordan. Design and Implementation of a Stochastic Wireless Sensor Network. University of Illinois at Urbana-Champaign, 2003.

U.S. Appl. No. 11/218,093, filed on Aug. 31, 2005, entitled "Revocation of Cryptographic Digital Certificates" Inventors: Craig B. Gentry et al.

S. Gokhale, P. Dasgupta. Distributed Authentication for Peer-to-Peer Networks. Arizona State University, pp. 1-7.

J. Benaloh, M. de Mare. One-Way Accumulators: A Decentralized Alternative to Digital Signatures (Extended Abstract), pp. 1-12.

J. Camenisch, A. Lysyanskaya. Dynamic Accumulators and Application to Efficient Revocation of Anonymous Credentials, Feb. 2002, p. 1-15.

O. Goldreich, S. Micali, A. Wigderson. Proofs that Yield Nothing But Their Validity and Methodology of Cryptographic Protocol Design, 1986 IEEE, pp. 174-187.

O. Goldreich, A. Kahan. How to Construct Constant-Round Zero Knowledge Proof Systems for NP. Mar. 1995, pp. 0-26.

M. Goodrich, R. Tamassia. An Efficient Dynamic and Distributed Cryptographic Accumulator, Jan. 13, 2001, pp. 1-12.

J. Camenisch, M. Michels A Group Signature Scheme Based on a RSA-Variant. BRICS Report Series RS-98-27 ISSN 0909-0878 Nov. 1998, pp. 1-18.

International Search Report for International Application No. PCT/US05/45796, 4 pages.

Written Opinion for International Application No. PCT/US05/45796, 4 pages.

\* cited by examiner

WITNESS DERIVATION BY USER

AUTHENTICATION (VERIFICATION)

RE-VALIDATION BY CA

WITNESS DERIVATION BY USER

AUTHENTICATION (VERIFICATION)

USE OF MODULAR ROOTS TO PERFORM AUTHENTICATION INCLUDING, BUT NOT LIMITED TO, AUTHENTICATION OF VALIDITY OF DIGITAL CERTIFICATES

CROSS REFERENCE TO RELATED APPLICATIONS

The present application is a division of U.S. patent application Ser. No. 11/304,200 filed on Dec. 15, 2005 now U.S. Pat. No. 7,266,692, which claims priority under 35 U.S.C. §119(e) to provisional U.S. patent application No. 60/637,177 filed Dec. 17, 2004, both of which are incorporated herein by reference.

BACKGROUND OF THE INVENTION

The present invention relates to performing authentication as to whether or not an element possesses a pre-specified property. An example is authenticating validity of a digital revocation in a public key infrastructure, or authenticating validity of an entitlement to use a resource (e.g. to sign onto a World Wide Web site).

FIG. 1 illustrates digital certificate validation and revocation in a public key infrastructure. Digital certificates 104 are used in public key infrastructures (PKI) to facilitate secure use and management of public keys in a networked computer environment. Users U1, U2, . . . utilize their computer systems 110.1, 110.2, . . . to generate respective key pairs (PK, SK) where PK is the public key and SK is the secret key. FIG. 1 shows a key pair ($PK_{U1}$, $SK_{U1}$) for user U1. The users register their public keys PK, over a network, with a certification authority (CA) 120. Alternatively, the key pairs can be generated by CA 120 and sent to the users. CA 120 is a secure, trusted computer system. For each public key PK, CA 120 generates a digital certificate 104. Certificate 104 contains the public key PK and the user's name and/or email address or addresses, may also contain the certificate's serial number SN (generated by the CA to simplify the certificate management), the certificate issue date D1, the expiration date D2, an identification of algorithms to be used with the public and secret keys, an identification of the CA 120, and possibly other data. The data mentioned above is shown at 104D. Certificate 104 also contains CA's signature 104-$Sig_{CA}$ on the data 104D. The signature is generated using CA's secret key $SK_{CA}$. CA 120 sends the certificate 104 to the user's (key owner's) computer system 110. Either the owner or the CA 120 can distribute the certificate to other parties to inform them of the user's public key PK. Such parties can verify the CA's signature 104-$Sig_{CA}$ with the CA's public key $PK_{CA}$ to ascertain that the certificate's public key PK does indeed belong to the person whose name and email address are provided in the certificate.

A certificate may have to be revoked prior to its expiration date D2. For example, the certificate owner U may change his affiliation or position, or the owner's private key $SK_U$ may be compromised. Other parties must be prevented from using the owner's public key if the certificate is revoked.

One approach to prevent the use of public keys of revoked certificates is through a certificate revocation list (CRL). A CRL is a signed and time-stamped list issued by CA 120 and specifying the revoked certificates by their serial numbers SN. These CRLs must be distributed periodically even if there are no new revoked certificates in order to prevent any type of replay attack. The CRL management may be unwieldy with respect to communication, search, and verification costs. The CRL approach can be optimized using so-called delta-CRLs, with the CA transmitting only the list of certificates that have been revoked in the previous time period (rather than for all time periods). The delta-CRL technique still has the disadvantage that the computational complexity of verifying that a certificate is currently valid is basically proportional to the number of time periods, since the verifier must confirm that the certificate is not in any of the delta-CRLs.

Certificate revocation trees (CRTs) can be used instead of CRLs as described in [15] (the bracketed numbers indicate references listed at the end before the claims).

Instead of CRLs and CRTs, CA 120 could answer queries about specific certificates. In FIG. 1, user U2 issues a query 150 with the serial number SN of certificate 104 of user U1. CA 120 responds with a validity status information 160 containing the serial number SN, a validity status field 160VS ("valid", "revoked" or "unknown"), and a time stamp "Time". The response is signed by CA (field 160-$Sig_{CA}$). This approach is used for Online Certificate Status Protocol (OCSP). See [23]. Disadvantageously, the CA's digital signature 160-$Sig_{CA}$ can be quite long (over 1024 bits with RSA), especially since the CA must be very secure. In addition, if CA 120 is centralized, the CA becomes a validation bottleneck. If CA 120 is decentralized (replicated), the security is weakened as the CA's signing key $SK_{CA}$ is replicated.

FIG. 2 illustrates a "NOVOMODO" approach, which allows CA 120 to provide an unsigned validity status through untrusted directories 210 at pre-specified time intervals (e.g. every day, or every hour, etc.). Directories 210 are computer systems that do not store secret information. The system works as follows.

Let f be a predefined public length-preserving function $$f: \{0,1\}^n \to \{0,1\}^n$$

where $\{0,1\}^n$ is the set of all binary strings of a length n. Let $f^i$ denote the f-fold composition; that is, $f^i(x)=x$ for $i=0$, and $f^i(x)=f(f^{i-1}(x))$ for $i>0$. Let f be one-way, i.e. given f(x) where x is randomly chosen, it is hard (infeasible) to find a pre-image z such that $f(z)=f(x)$, except with negligible probability. "Infeasible" means that given a security parameter k (e.g. k=n), the pre-image z cannot be computed in a time equal to a predefined polynomial in k except with negligible probability. Let us assume moreover that f is one-way on its iterates, i.e. for any i, given $y=f^i(x)$, it is infeasible to find z such that $f^i(z)=y$.

We can assume, without loss of generality, that CA is required to provide a fresh validity status every day, and the certificates are valid for one year, i.e. 365 days (D2−D1=365 days). To create a certificate 104 (FIG. 2), CA 120 picks a random "seed" number x and generates a "hash chain" $c_0$, $c_1$, . . . $c_{365}$ wherein:

$$c_{365}=f(x), c_{364}=f(f(x)), \ldots c_1=f^{365}(x), c_0=f^{366}(x). \quad (1)$$

We will sometimes denote x as x(SN) for a certificate with a serial number SN, and similarly $c_i=c_i(SN)$ where $i=0, 1, \ldots$. The value $c_0$ is called a "validation target". CA 120 inserts $c_0$ into the certificate 104 together with data 104D (FIG. 1). CA 120 also generates a random revocation seed number $N_0$, computes the "revocation target" $N_1=f(N_0)$, and inserts $N_1$ into certificate 104. CA 120 keeps all $c_i$ secret for $i>0$. The values x and $N_0$ are also secret. Clearly, all $c_i$ can all be computed from x, and the validation target $c_0$ can be computed from any $c_i$. CA 120 stores in its private storage the values x and $N_0$ for each certificate 104, and possibly (but not necessarily) caches the $c_i$ values.

Every day i (i=1, 2, . . . 365), a certificate re-validation is performed for the valid certificates as follows. For each certificate 104, CA distributes to directories 210 a validation data structure which includes, in addition to a validity status indication (not shown in FIG. 2, can be "valid" or "revoked"):

1. the certificate's "i-token" $c_i$ if the certificate is valid on day i;

2. the revocation seed $N_0$ if the certificate has been revoked.

(We will call $c_i$ a "validity proof", and $N_0$ a "revocation proof".) This information is distributed unsigned. Each directory 210 provides this information, unsigned, to a requester system 110 in response to a validity status request 150 (FIG. 1). To verify, the requester (verifier) 110 performs the following operations:

1. If the validity status is "valid", the verifier 110 checks that $f^i(c_i)=c_0$.

2. If the validity status is "revoked", the verifier 110 checks that $f(N_0)=N_1$.

Despite the validity information being unsigned, the scheme is secure because given $c_i$, it is infeasible to compute the subsequent tokens $c_{i+1}, c_{i+2}, \ldots$.

To reduce the communication between CA 120 and directories 210, a hash chain (1) can be generated for a set of certificates 104, and a single i-token $c_i$ can be distributed for the set if the set is "unrevoked" (i.e. all the certificates are unrevoked in the set). The certificate 140 will contain a separate target $c_0$ for each set containing the certificate and associated with a hash chain (see [1]).

Certificate revocation can also be performed using accumulators. See [37]. An accumulator is a way to combine a set of values (e.g. a set of valid certificates) into a shorter value. A formal definition of a "secure" accumulator is given in Appendix A at the end of this disclosure before the claims. An accumulator example can be constructed as follows. Let us denote all possible values that can be accumulated as $p_1, \ldots, p_t$. (For example, each $p_i$ can be a unique number assigned to a certificate, and we want to accumulate the values corresponding to the valid certificates.) Suppose $v_0$ is the accumulator value for the empty set. Let $f$ be a one-way function. To accumulate $p_1$, we compute the accumulator as follows:

$$v(\{p_1\})=f(v_0,p_1) \qquad (2)$$

Now to accumulate $p_2$, we set the accumulator to be $v_2=f(v_1, p_2)$, and so on. More generally, the accumulator value for some set $\{p_{i_1}, \ldots, p_{i_m}\}$ is $$v(\{p_{i_1}, \ldots, p_{i_m}\})=f(f(\ldots f(v_0,p_{i_1})\ldots),p_{i_m}) \qquad (3)$$

The function $f$ can be chosen such that the accumulation order does not matter, i.e.

$$f(f(v,p_i),p_j)=f(f(v,p_j),p_i) \qquad (4)$$

(this is the "quasi-commutative" property).

In each period j, CA 120 can send to the directories 210 a pair $(v_j,t)$ where $v_j$ is the accumulator value for the set of the valid certificates, and t is a time stamp. The directories can respond to queries 150 with some proof that the accumulator value $v_j$ accumulates the value $p_i$ corresponding to the certificate of interest.

A common accumulator is an RSA accumulator defined as follows:

$$f(v,p)=v^p \bmod n \qquad (5)$$

where p is a positive integer, and $n=q_1 q_2$ is the product of large prime numbers $q_1$ and $q_2$. In this case, $$v(\{p_{i_1}, \ldots, p_{i_m}\})=v_0^{p_{i_1}, \ldots, p_{i_m}} \bmod n \qquad (6)$$

The certificate validation is performed as follows. Without loss of generality, suppose that the values $p_1, \ldots, p_m$ correspond to the valid certificates in a period j. Then the accumulator value distributed by CA 120 to directories 210 is $$v_j=v_0^{p_1 \cdots p_m} \bmod n \qquad (7)$$

If a verifier 110 inquires a directory 210 of the status of a certificate corresponding to the value $p_i$ which is one of $p_1, \ldots, p_m$, the directory sends to the verifier the accumulator value $v_j$ and a "witness" value $$s_{i,j}=v_0^{p_1 \cdots p_{i-1}p_{i+1}\cdots p_m} \bmod n \qquad (8)$$

The verifier checks that $$s_{i,j}^{p_i}=v_j \bmod n \qquad (9)$$

If this equality holds, the certificate is assumed to be valid.

The witness $s_{i,j}$ is hard to forge provided that it is hard to compute the $p_i$-th root of $v_j$. The $p_i$-th root computation is hard if the adversary does not know the factorization of n and the strong RSA assumption is valid (this assumption is defined in Appendix A). However, it is possible to keep $p_i$ and $s_{i,j}$ secret. For example, instead of providing the values $s_{i,j}$ and $p_i$ to the verifier, the verifier can be provided with a proof that such values exist and are known to the certificate owner.

Accumulators can be used more generally to prove that an element satisfies some pre-specified property.

SUMMARY

This section summarizes some features of the invention. Other features are described elsewhere in this disclosure. The invention is defined by the appended claims.

In some embodiments of the present invention, accumulators are constructed using modular roots with exponents corresponding to the accumulated values. For example, suppose we need an accumulator to accumulate all the elements that possess some property (e.g. all the valid certificates) or all the elements that do not possess that property (e.g. all the revoked certificates). We will associate each element with an integer greater than 1. Let $PP_m=\{p_1, \ldots, p_m\}$ be the set of integers associated with the elements to be accumulated (as in (7)), and denote the product of these integers as $P_m$:

$$P_m=\Pi_{l=1}^m p_l \qquad (10)$$

(By definition herein, the product of the empty set of numbers is 1; i.e. $P_m=1$ if $PP_m$ is empty.) In some embodiments, the accumulator value represents the $P_m$-th root of some value u, e.g.

$$v_j=u^{1/P_m} \bmod n \qquad (11)$$

In some embodiments, the following advantages are achieved.

Suppose the value (11) accumulates valid digital certificates. The value (11) can be modified by exponentiation to de-accumulate all the values $p_l$ except for some given value $p_i$, i.e. to compute $$v_j^{p_1 \cdots p_{i-1}p_{i+1}\cdots p_m}=u^{1/p_i} \qquad (12)$$

This exponentiation can be performed by a directory 210 or by the certificate owner's system 110, without knowledge of factorization of the modulus n. The value (12) is the accumulator value as if $p_i$ were the only accumulated value. The witness value needed for verification can also be computed as if $p_i$ were the only accumulated value. The verification (the authentication) can be performed using the values that do not depend on accumulated values other than $p_i$. Alternatively, the verification can be performed with the accumulator and witness values that incorporate some other accumulated values but not necessarily all the accumulated values. Therefore, if a directory 210 or a user 110 are responsible for providing validity proofs for less than all of the certificates, the directory 210 or the user 110 (the "validity prover") can use an accumulator that accumulates less than all of the valid certificates. In some embodiments, this feature reduces the number of computations needed to be performed by all of the provers.

In some embodiments, the value u=u(j) can depend on the time period j for which the authentication is provided (unlike the value $v_0$ in (7)). Therefore, the time stamp t can be omitted.

In some embodiments, the accumulator accumulates the revoked certificates rather than the valid certificates. In some embodiments, the witness values for an integer $p_i$ depend on other p values.

In some embodiments, the witness values are used as encryption keys for encrypting validity proofs. The validity proofs can be constructed using a non-accumulator based validation system, e.g. as in FIG. 2. For example, let $c_j(i)$ denote the token c; for the period j for a certificate 140.i, where $c_j$ is formed as in (1). At the set-up time, when a user system 110 joins the certificate validation system, the CA generates the tokens $c_j(i)$ for all the periods j for the user. The CA also generates the witness values for all the periods j. The CA encrypts each token $c_j(i)$ under a key equal to (or obtained from) the witness value for the period j, under a symmetric encryption system. CA 120 transmits all the encrypted values to the user.

In each period j, if the certificate 140.i is still valid, CA 120 transmits the decryption key (the witness value) for the period j to the user, enabling the user to recover the token $c_j(i)$. The user provides the token to the verifiers to proof the certificate validity as described above in connection with FIG. 2.

Some embodiments of the invention are suitable for limited bandwidth or low reliability networks, for example in ad hoc networks, where the nodes 110 may have low computational and transmission power, and where the nodes may have only incomplete information about the topology of the network. (An ad hoc network is a self-configuring wireless network of mobile routers.)

Some embodiments are communication and storage efficient.

The invention is not limited to the features and advantages described above. Other features are described below. The invention is defined by the appended claims.

DESCRIPTION OF PREFERRED EMBODIMENTS

Figure 1:
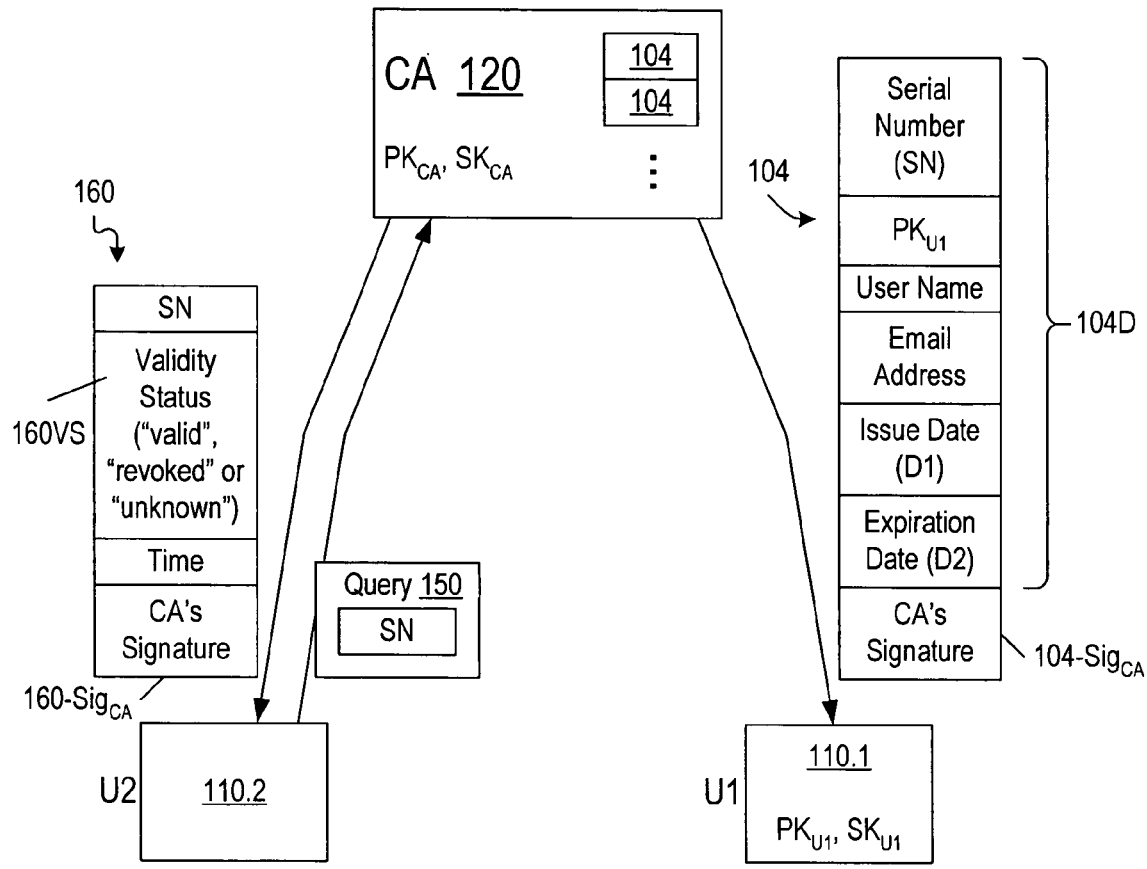
FIGS. 1, 2 are block diagrams illustrating prior art certificate revocation schemes.
Figure 2:
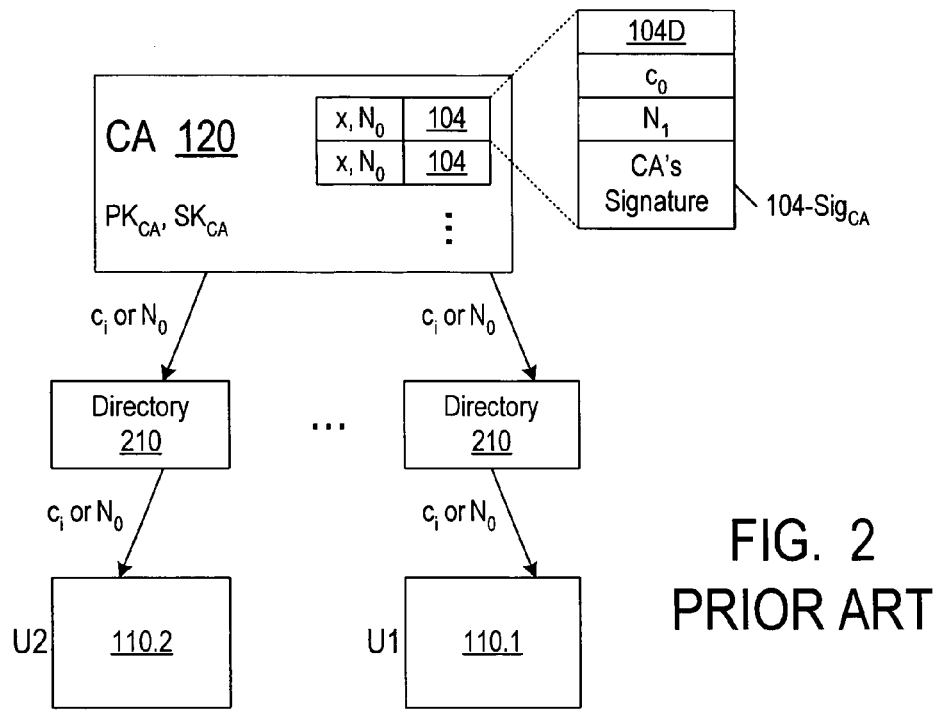

The embodiments described in this section illustrate but do not limit the invention. The invention is defined by the appended claims.

In the following description, numerous details are set forth. However, the present invention may be practiced without these details. Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or some computing device, that manipulates and transforms data represented as physical (electronic) quantities within the computer system's registers and other storage into other data similarly represented as physical quantities within the computer system storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMS, EEPROMS, magnetic or optical cards, or any type of media suitable for storing electronic instructions, and each coupled to a computer system.

Some of the algorithms presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Preliminaries

MODEL AND NOTATION. In our model, we have a certification authority CA, a certificate owner or holder Owner, and a certificate verifier VV. Here Owner has a certificate issued by CA. The concept of a certification authority may apply more generally to any authority responsible for issuing access control privileges or authorizations to a plurality of individuals. The concept of an owner may be tied to a specific human being or organization operating a computer or to the computer itself, e.g. a world wide web server. Similarly, the verifier may be tied to a specific human being or organization operating a computer or to the computer itself, e.g. an access control server determining if it should permit access to certain services.

In a given transaction, VV wishes to ascertain that the certificate has not been revoked prior to its expiration date. To do so, VV must obtain a proof of validity or a proof of revocation that is or has been issued by the certification authority CA. VV may obtain this proof either from the CA directly, or through some other distribution mechanism.

We let $\{0,1\}^*$ denote the set of all bit strings. For a bit string s, we denote its length by $|s|$. We let H denote a cryptographic compression function that takes as input a b-bit payload as well as a v-bit initialization vector or IV, and produces a v-bit output. We assume $b \geq 2v$, which holds for all well-known constructions in use. For the constructions we describe here, we typically take $b=2v$. We assume these cryptographic compression functions are collision resistant; that is, finding two distinct inputs $m_1 \neq m_2$ such that $H(IV, m_1)=H(IV, m_2)$ is difficult. We assume that the IV is fixed and publicly known. For notational simplicity, we will not always explicitly list IV as an argument in the hash function. A practical example of such a cryptographic compression function is SHA-1[26]. SHA-1's compression function has an output and IV size of 20-bytes and a 64-byte payload size. In many embodiments, we will not need to operate on data larger than the compression function payload size; however there are numerous standard techniques such as iterated hashing or Merkle-trees [19] for doing so. For simplicity, we will use the term hash function instead of compression function, where it is understood that a hash function can take arbitrary length strings $\{0,1\}^*$ and produce a fixed length output in $\{0,1\}^v$.

In practice, one often constructs a length preserving function that is one way on its iterates by starting with a hash function H and padding part of the payload to make it length preserving.

Finally, for a real number r, we set $\lceil r \rceil$ to be the ceiling of r, that is, the smallest integer value greater than or equal to r. Similarly, $\lfloor r \rfloor$ denotes the floor of r, that is, the largest integer value less than or equal to r.

Let A be an algorithm. By $A(\cdot)$ we denote that A has one input. By $A(\cdot, \ldots, \cdot)$ we denote that A has several inputs). By $A_{(\cdot)}$ we will denote that A is an indexed family of algorithms. $y \leftarrow A(x)$ denotes that y was obtained by running A on input x. In case A is deterministic, then this y is unique; if A is probabilistic, then y is a random variable. If S is a set, then $y \leftarrow S$ denotes that y was chosen from S uniformly at random. Let b be a boolean function. The notation $(y \leftarrow A(x): b(y))$ denotes the event that $b(y)$ is true after y was generated by running A on input x. Finally, the expression $$Pr[\{x_i \leftarrow A_i(y_i)\}_{1 \leq i \leq n}: b(x_n)]$$

denotes the probability that $b(x_n)$ is TRUE after the value $x_n$ was obtained by running algorithms $A_1 \ldots, A_n$ on inputs $y_1, \ldots y_n$.

Accumulation of Valid Certificates

Some accumulator schemes will now be described with respect to the digital certificate validation. These schemes can also be used for other authentication operations as described above.

To simplify the description, we will assume that each certificate owner Ui operates just one system 110.i and owns at most one certificate. This is not in fact necessary.

CA SET-UP. The CA 120 generates a composite modulus n. In some embodiments, n is the product of two primes, but n can also be the product of three or more primes. In some embodiments, n is public, but n is hard to factor, and the factorization is known only to the CA 120.

Figure 4:
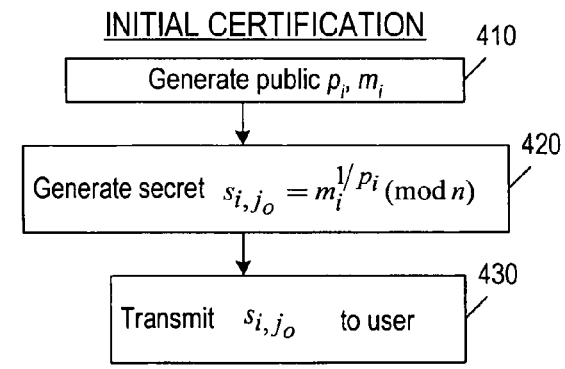
FIG. 4 is a flowchart of operations performed by a certification authority (CA) in initial certification according to some embodiments of the present invention.

INITIAL CERTIFICATION (FIG. 4): Suppose the i-th user $u_i$ joins the system in or after some time period $j_0$. At step 410, the CA assigns a positive integer $p_i$ to $u_i$. The numbers $p_i$ are chosen to be mutually prime with the modulus n. Also, each $p_i$ does not divide the LCM (lowest common multiple) of the remaining numbers $p_l$, $l \neq i$. For example, the numbers $p_1, \ldots, p_i$ can be distinct prime numbers, or pairwise relatively prime.

Figure 3:
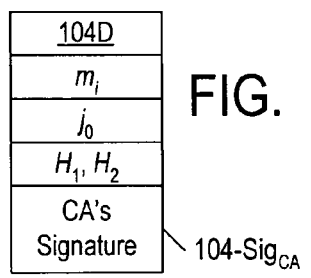
FIG. 3 illustrates a digital certificate according to some embodiments of the present invention.

The CA computes a unique public value $m_i \in (Z/nZ)^*$ for the user $u_i$. ($Z/nZ$ is the ring of all residue classes modulo n, and $(Z/nZ)^*$ is the multiplicative group of the invertible elements of $Z/nZ$, i.e. of the elements defined by integers mutually prime with n.) In some embodiments, $$m_i = H_1(u_i, p_i, j_0, w_i) \in (Z/nZ)^* \qquad (13)$$

where $H_1$ is a predefined function, e.g. a one-way collision resistant function, $u_i$ is the user identification (e.g. user name), and $w_i$ is an optional string (which may contain $u_i$'s public key and/or some other information). The value $m_i$ thus binds $p_i$ to $u_i$'s identity. If desired, any one or more of the values $j_0$, $p_i$, $m_i$ and the identification of the function $H_1$ can be made part of the certificate 140. See FIG. 3 showing a certificate 140 containing $m_i$, $j_0$, and specifying the functions $H_1$ and $H_2$ ($H_2$ is described below).

At step 420, the CA computes an "initial certificate" value $$s_{i,j_0} = m_i^{1/p_i} (\bmod n) \qquad (14)$$

The CA keeps this value secret, and transmits it to the user $u_i$'s system 110 in an encrypted form.

Figure 5:
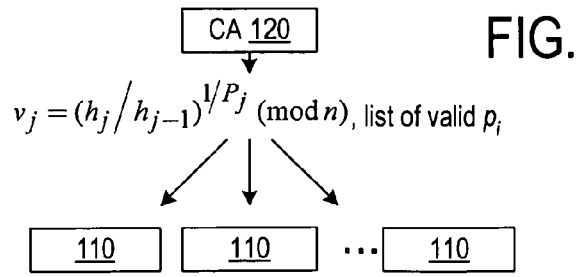
FIG. 5 is a block diagram illustrating certificate re-validation operations performed by a CA according to some embodiments of the present invention.

CERTIFICATE RE-VALIDATION BY CA IN TIME PERIOD j (FIG. 5): At the start of, or shortly before, the period j, the CA performs the following operations. Let t denote the total number of users in the system (i.e. the total number of users for whom the initial certification of FIG. 4 has been performed). Let UU denote the set of these users: $UU=\{u_1, \ldots, u_t\}$. PP denotes the set of the corresponding p numbers: $PP=\{p_1, \ldots, p_t\}$. Let $UU_j \subseteq UU$ be the subset of users that are to be re-validated in period j. Let $PP_j \subseteq PP$ be the corresponding set of numbers p, and let $$P_j = \Pi_{p_k \in PP_j} p_k \quad (15)$$

i.e., $P_j$ is the product of the integers in $PP_j$. (By definition, the product of the empty set of numbers is 1.) The CA computes $$h_j = H_2(j) \in (Z/nZ)^*, h_{j-1} = H_2(j-1) \in (Z/nZ)^* \quad (16)$$

where $H_2$ is the same as $H_1$ or some other function. The CA also computes the accumulator $$v_j = v_j(PP_j) = (h_j/h_{j-1})^{1/P_j} (\text{mod } n) \quad (17)$$

Of note, in some embodiments, the root in (17) exists with a very high probability.

The CA transmits the following data to the system 110 of each user in $UU_j$ (this data can also be broadcast to a larger set of users if such broadcast transmission is more efficient in terms of communication):

1. $v_j$;

2. the list of users in $UU_j$, which may be just the list of numbers $p_i$ in $PP_j$. (Since there can be overlap among these lists for different periods j, the CA can simply transmit the information that has changed since the previous period; in this case, the CA transmits the list of numbers in $PP_j$ to each new user at step 430 of FIG. 4.)

Figure 6:
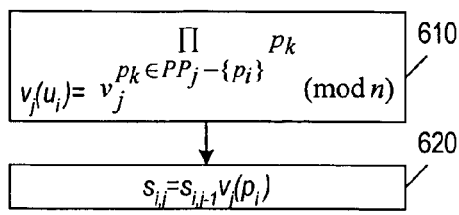
FIG. 6 is a flowchart of witness derivation operations according to some embodiments of the present invention.

PERSONAL ACCUMULATOR AND WITNESS DERIVATION BY USERS (FIG. 6): At step 610, each user $u_i$ in $UU_j$ computes its "personal accumulator" $v_j(p_i)$, i.e. the accumulator which accumulates only the user's $p_i$ value:

$$v_j(p_i) = (h_j/h_{j-1})^{1/p_i} (\text{mod } n) \quad (18)$$

This value is computed from the $v_j$ value (17) by exponentiation:

$$v_j(p_i) = v_j \prod_{p_k \in PP_j - \{p_i\}} p_k \ (\text{mod } n) \quad (19)$$

At step 620, the user aggregates this personal accumulator with previous personal accumulators to obtain a witness for the period j:

$$s_{i,j} = s_{i,j-1} v_j(p_i) = s_{i,j-1} (h_j/h_{j-1})^{1/p_i} (\text{mod } n) \quad (20)$$

The equations (20) and (14) imply that $$s_{i,j} = s_{i,j_0} (h_j/h_{j_0})^{1/p_i} (\text{mod } n) \quad (21)$$

Figure 7:
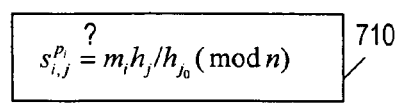
FIG. 7 is a flowchart of authentication according to some embodiments of the present invention.

USER AUTHENTICATION (FIG. 7): A user $u_i$ can provide $s_{i,j}$ to the verifier, along with (if necessary) the values for ($u_i, p_i, j_0, w_i$). At step 710, the verifier:

1. computes $m_i$ from (13) or obtains it from the certificate 140 (FIG. 3);

2. computes $h_j = H_2(j)$ and $h_{j_o} = H_2(j_o)$ (see (16)); and 3. confirms that $$s_{i,j}^{P_i} = m_i h_j / h_{j_0} (\text{mod } n) \quad (22)$$

ALTERNATIVE USER AUTHENTICATION: Instead of giving the witness $s_{i,j}$ to the verifier, the user can use $s_{i,j}$ as a private key in an identity-based GQ (Guillou-Quisquater) signature scheme. This scheme is described in Appendix B at the end of this disclosure before the claims. The CA performs the functions of GQ's PKG (private key generator); GQ's parameters are set as follows: $B=s_{i,j}$, $v=p_i$, and $J=m_i^{-1}$ mod n. The authentication proceeds as follows:

The verifier sends to the user a random message m.

The user generates a random number r and computes:

$$d=H(m \| r^{p_i}), D=rs_{i,j}^d (\text{mod } n) \quad (23)$$

where H is some predefined public function (e.g. $H_1$ or $H_2$). The user sends the values m, $r^{p_i}$, and D to the verifier.

The verifier computes $J=m_i^{-1}$ mod n and checks that the following equations hold:

$$d=H(m \| J^d D^{p_i})$$

$$J^d D^{p_i} = r^{p_i} (h_j/h_{j_o})^d (\text{mod } n) \quad (24)$$

This scheme may reduce total bandwidth because the verifier does not need the certificate 140. Note: for the GQ signature scheme to be secure, it is desirable that each $p_i > 2^{160}$.

REMARKS. 1. First, $s_{i,j_0}$ can be computed in some other way, not necessarily as in (14).

2. ANONYMOUS AUTHENTICATION. If we want to allow the user nodes 110 to sign messages anonymously—i.e., to be able to authenticate themselves as users that have been certified by the CA, but without revealing their actual identities—we can handle initial certification differently. For example, instead of (13), the CA can set $m_i$ to be independent of the user's identity, e.g.:

$$m_i = h_{j_0} = H(j_0) \in (Z/nZ)^* \quad (25)$$

The $m_i$ value is then provided to the user. To hide the fact that the $m_i$ value is provided to the user, the $m_i$ value may be transmitted to the user via a secure channel (e.g., by encrypting this value such that only $u_i$ can decrypt it). Then, it follows from (14) and (21) that:

$$s_{i,j} = h_j^{1/p_i} (\text{mod } n) \quad (26)$$

As mentioned below in Appendix A, there are efficient zero-knowledge (ZK) proofs through which user $u_i$ can prove, in the $j^{th}$ time period, that it knows a $p^{th}$ root of $h_j$ modulo n for some (unrevealed) number p that is contained in a specified interval I of integers, i.e.

$$PK\{(\alpha, \beta): \alpha^\beta = h_j \bmod n \wedge \beta \in I\}$$

See [41], [42]. The interval I can be an interval containing all the numbers $p_i$. Using this scheme, the user can authenticate itself anonymously if and only if it has obtained an initial certificate $s_{i,j_0}$ and the subsequent personal accumulator values $v_j(p_i)$ (see (18), (19)). The CA can revoke the user as before—i.e., by not re-validating it (not including $p_i$ in the product $P_j$ in FIG. 5).

As mentioned above, the accumulator techniques are not limited to a user possessing a single certificate or to a digital certificate revocation. For example, a user $u_i$ may or may not possess one or more of entitlements $e_1, e_2, \ldots, e_r$. During initial certification, the user $u_i$ is assigned a unique integer $p_{i,k}$ if the user is to be certified for an entitlement $e_k$. The entitlement proof proceeds as described above with respect to equations (13)-(26), with numbers $p_i$ replaced by $p_{i,k}$, with $s_{i,j}$ replaced by $s_{i,k,j}$, etc.

In some of these embodiments, however, a value $p_i$ is computed as the product of $p_{i,k}$. For example, if the user is initially certified for all the entitlements, then:

$$p_i = p_{i,1} \cdots p_{i,r} \tag{27}$$

In some embodiments, the integers $p_{i,k}$ are mutually prime relative to each other and to the CA's modulus n. The user $u_i$'s initial certificate is $s_{i,j_0} = m_i^{1/p_i} \pmod{n}$ as in (14), and $u_i$ can use exponentiation to de-accumulate all the values $p_{i,l}$ except a selected value $p_{i,k}$ for some k:

$$s_{i,k,j_0} = m_i^{1/p_{i,k}} \pmod{n} = s_{i,j_0}^{\prod_{l \ne k} p_{i,l}} \pmod{n} \tag{28}$$

The user can use this value to demonstrate that it possesses the entitlement that corresponds to prime $p_{i,k}$ without revealing the user's other entitlements. The CA can revoke a specific entitlement $e_k$ for the user without revoking the user's other entitlements, simply by issuing a validation accumulator in (17) that does not accumulate $p_{i,k}$ (i.e. the product $P_j$ is computed as in (15) except that $p_i$ is replaced with $p_i/p_{i,k}$ (the number $p_{i,k}$ is not included in the product)). If the user wants to sign anonymously and unlinkably, then the user cannot reveal its specific value of $p_{i,k}$, but it would seem to make it difficult for a verifier to determine what entitlement the user is claiming (if the verifier cannot see the value of $p_{i,k}$). We can get around this problem by, for example, associating each entitlement $e_k$ to a range of integers $I_k$. This range will contain all the $p_{i,k}$ values for all the users $u_i$ initially certified to have the entitlement $e_k$. The ranges $I_k$ do not overlap in some embodiments. Then the user can prove in ZK that it possesses a modular p-th root (for some unrevealed number p in the range $I_k$) of the appropriate value, i.e. the user can provide the following proof of knowledge:

$$PK\{(\alpha,\beta): \alpha^\beta = C \bmod n \wedge \beta \in I_k\} \tag{29}$$

where $C = m_i h_j/h_{j-1}$ or $C = h_j$ (see (21), (26)). See [41], [42]. The user can also prove that it possesses multiple entitlements simultaneously, e.g., by proving (in ZK if desired) its possession of a $p^{th}$ root for some p that is the product of (for example) two integers $p_1$ and $p_2$ in ranges corresponding to the claimed entitlements:

$$PK\{(\alpha,\beta): \alpha^\beta = C \bmod n \wedge \beta = \beta_1\beta_2 \wedge \beta_1 \in I_{k_1} \wedge \beta_2 \in I_{k_2}\} \tag{30}$$

See [41], [42].

USERS MOVING FROM NETWORK TO NETWORK: Suppose the CA has users (certificate owner systems) 110 in different networks, and the users move from a network to a network (e.g. some of the networks may be ad hoc networks). The CA can calculate a separate accumulator (say, (17)) for each network. Each accumulator will accumulate only the valid users in the corresponding network based on the CA's knowledge of the current composition of users in each network. Each user will compute its personal accumulator value and/or witness value (e.g., as in (18), (20), (26), and/or (28)). The user can move to another network and use the same personal accumulator value and/or witness value in the other network.

AGGREGATION OF PERSONAL ACCUMULATORS: Multiple personal accumulators can be aggregated into a single value, in order to save bandwidth; from this aggregated value, a verifier can batch-verify that multiple users are indeed certified. For example, in the scheme of equations (17), (22), user $u_i$ (if it is still valid) possesses a personal value $s_{i,j}$ that satisfies $$s_{i,j}^{p_i} = m_i(h_j/h_{j_0,i}) \pmod{n} \tag{31}$$

where $m_i$ is as in (13), and $j_{o,i}$ is the period $j_o$ for the user $u_i$. Denote $$z_i = m_i(h_j/h_{j_0,i}) \pmod{n}. \tag{32}$$

Then, for multiple users in period j, their personal values can simply be multiplied together $$S = \prod_{i=1}^{t'} s_{i,j} \pmod{n} \tag{33}$$

where t' is the number of users which take part in the aggregation (or the number of certificates or entitlements belonging to a user if each $u_i$ is a certificate or an entitlement). A verifier can use the value (33) to confirm that users (or certificates or entitlements) $(u_1, \ldots, u_{t'})$ are valid by confirming that:

$$S^{\prod_{i=1}^{t'} p_i} = \prod_{i=1}^{t'} z_i^{\frac{1}{p_i} \prod_{l=1}^{t'} p_l} \pmod{n}. \tag{34}$$

DE-ACCUMULATION. We will now discuss concrete approaches to the de-accumulation of values from the accumulator computed by the CA; however, we note that the CA does not need to compute a single accumulator value that accumulates all of the values associated to all of the valid nodes 110 in the network. Instead, the CA can use a tradeoff, which we now describe. De-accumulation is somewhat computationally expensive. Procedure Split(v,P) below performs de-accumulation on an accumulator v that accumulates t k-bit numbers $P = \{p_i\}$; the procedure's output is t personal accumulators; the execution time is $O(t \log^2 t)$ (where we consider k to be a constant). Let us denote the accumulator accumulating an empty set of values as u (in equation (17), $u = h(j)/h(j-1)$). Then $$u = v^{\prod_{p_i \in P} p_i} \pmod{n}. \tag{35}$$

Procedure Split(v,P):
1. Split the set P into two disjoint halves $P_1$ and $P_2$.
2. Compute $$v_1 = v^{\prod_{p_i \in P_2} p_i} \pmod{n};$$

(mod n); this is the accumulator for the set $P_1$.

3. Compute $$v_2 = v^{\prod_{p_i \in P_1} p_i} \pmod{n};$$

(mod n); this is the accumulator for the set $P_2$.

4. If $P_1$ has only one member, output $(v_1, P_1)$, otherwise call Split $(v_1, P_1)$.

5. If $P_2$ has only one member, output $(v_2, P_2)$, otherwise call Split $(v_2, P_2)$.

End of Split (v,P)

As a rule of thumb, exponentiating a number modulo n by a product of t' numbers takes time proportional to t'; thus, the first split operation (steps 2 and 3 in procedure Split(v,P)) is the most expensive one in the recursion above. (Actually, since there are t distinct numbers $(p_1, \ldots, p_t)$, the $p_i$ are O(log t) bits apiece on average, so that the exponentiation is proportional to t' log t'; since the Split algorithm can recurse to a depth of log t', the overall computation complexity is t $\log^2$ t.) To reduce the amount of de-accumulation that needs to be performed, the CA can (for example) compute two accumulators—one for each of two halves $P_1$ and $P_2$ of P—and transmit these two accumulators to the users, thereby allowing the users to skip the first split operation and thereby reducing their computation. The CA can reduce their computation further by transmitting even more accumulators, each for an even smaller subset of the users. In computing these multiple accumulators, it is advantageous for the CA to use its knowledge of the current network topology to enhance the performance of the scheme. For example, suppose that the users are divided into several (say, 10) topological areas. Then, instead of using one product of integers $P_j$ as in (15), the CA can compute 10 such products $P_{j,1}, \ldots, P_{j,10}$, and 10 area-specific accumulators $(h_j/h_{j-1})^{1/P_{j,k}}$. The CA then transmits each one of these 10 area-specific accumulators to the respective one of the 10 topological areas (along with a list of the re-validated users in that area). Users in a given area can compute their personal accumulators and witnesses from the area-specific accumulators.

De-accumulation is also relevant to how the personal accumulators (18)-(19) are computed. Clearly, in terms of computation, it is non-optimal for each of the t users to perform de-accumulation (18), (19) independently; doing it this way would entail $O(t^2)$ computation (actually, worse, since the size of the $p_i$ must grow at least as fast as log t). In some embodiments, the users compute their personal accumulators cooperatively, as illustrated, for example, in FIG. 8 and described below.

If the performance metric is minimum communication, a simple broadcast by the CA of the accumulator (17) to t users (see FIG. 5) is a good way of accumulator distribution. This results in overall communication of O(t). However, overall computation is at least $O(t^2)$ because each of t users has to perform t−1 exponentiations on the same accumulator.

Figure 8:
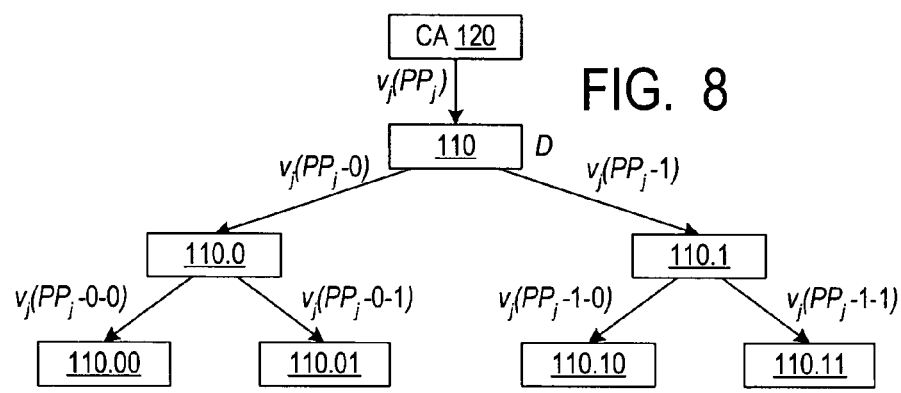
FIG. 8 is a block diagram showing data transmitted over networks in de-accumulation operations according to some embodiments of the present invention.

Referring to FIG. 8, let $PP_j$ be the set of valid users (i.e. the set of the p numbers corresponding to the valid users). At the stage of FIG. 5 (re-validation), the CA sends the accumulator $v_j(PP_j)$ (see (17) for example) and the numbers p in the set $PP_j$ to a designated node 110 (also marked D in FIG. 8). Node D divides the set $PP_j$ into sub-groups (sub-sets). In one example, the sub-group $PP_j$-0 includes one or more of nodes 110.0, 110.00, 110.01; the sub-group $PP_j$-1 includes one or more of nodes 110.1, 110.10, 110.11; the third sub-group consists of node 110 itself if this is a valid node. Node D computes the accumulator $v_j(PP_j$-0) for the sub-group $PP_j$-0, and the accumulator $v_j(PP_j$-1) for the sub-group $PP_j$-1. This computation can be performed by de-accumulating the nodes which are not sub-group members. See e.g. equation (19) and Procedure Split(v,P), steps 1 and 2. If node D is valid (i.e. its number p is in $PP_j$), node D also computes its personal accumulator as in FIG. 6. Node D transmits the accumulator $v_j(PP_j$-0), and the p numbers in the set $PP_j$-0, to node 110.0. Node D transmits the accumulator $v_j(PP_j$-1), and the p numbers in the set $PP_j$-1, to node 110.1. The nodes 110.0, 110.1 perform the same operations as node D. In particular, node 110.0 divides the valid users $PP_j$-0 into sub-groups. In one example, nodes 110.0, 110.00, 110.01 are valid; the sub-group $PP_j$-0-0 consists of node 110.00; the sub-group $PP_j$-0-1 consists of node 110.01; the third sub-group consists of node 110.0. The sub-groups are determined by node 110.0 from the p numbers in $PP_j$-0. Node 110.0 computes accumulators $v_j(PP_j$-0-0), $v_j(PP_j$-0-1) for the respective sub-groups $PP_j$-0-0, $PP_j$-0-1, and also computes its personal accumulator as in FIG. 6. Node 110.0 transmits the accumulator $v_j(PP_j$-0-0), and the corresponding p number, to node 110.00. Node 110.0 transmits the accumulator $v_j(PP_j$-0-1), and the corresponding p number, to node 110.01. The accumulators $v_j(PP_j$-0-0), $v_j(PP_j$-0-1) are personal accumulators, so the nodes 110.00, 110.01 do not need to derive their personal accumulators.

Node 110.1 performs operations similar to those for node 110.0.

This procedure can be extended recursively to any number of nodes. The procedure is not limited to the "binary-tree" type of FIG. 8. A node can split a set of users into any number of sub-groups in addition to itself, possibly resulting in a non-binary-tree type operation. Also, in some embodiments, the accumulators are transmitted only to valid nodes. For example, if node 110 is invalid, then CA 120 transmits the accumulator $v_j(PP_j)$ to a valid node instead. For communication efficiency, the sub-groups are selected so that the communications are efficient within each sub-group. For example, in case of ad hoc networks, the sub-groups can be selected based on geographic proximity, with the proximate nodes being grouped together.

Now, we describe one approach for selecting the sub-groups, where nodes only have local topology information. Roughly speaking, the idea is as follows. To partition (a portion of) the network, the designated node D chooses two "group heads" in the network, such as nodes 110.0, 110.1 in FIG. 8. (More than two group heads can also be selected.) These group heads can be chosen randomly. Alternatively, if the designated node has some topological information, it can use that information to attempt to choose the two group heads in a way that they are topologically distant—preferably on opposite sides of the network from each other. After D picks the two group heads, the designated node tells the two group heads to transmit different messages; for example, the designated node may tell the first group head to transmit '0' and the second to transmit '1'. Then, each group head (e.g. 110.0, 110.1) "floods" the network with its particular message. When this occurs, the other nodes in the network will either receive a '0' first or the '1' first. Nodes that receive a '0' first (e.g. nodes 110.00, 110.01) report back to the designated node D (or to the group head 110.0) that they are a member of the 0-group; the members of the 1-group report similarly. The designated node D (or the respective group heads) receives this information, and it de-accumulates the accumulator into two halves—one accumulator for the 0-group and one for the 1-group. If the designated node performed this de-accumulation (as in the procedure illustrated in FIG. 8), it passes along the appropriate accumulators to their corresponding group heads (110.0, 110.1). Then, each group head becomes the designated node for its corresponding sub-network, and the entire process described above is repeated for the sub-networks. Now, we will provide more detail for one embodiment.

Figure 9:
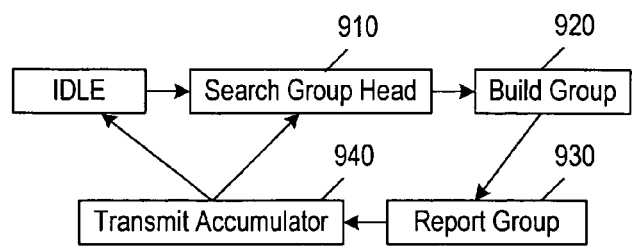
FIG. 9 is a state diagram illustrating accumulator transmissions according to some embodiments of the present invention.
Figure 10:
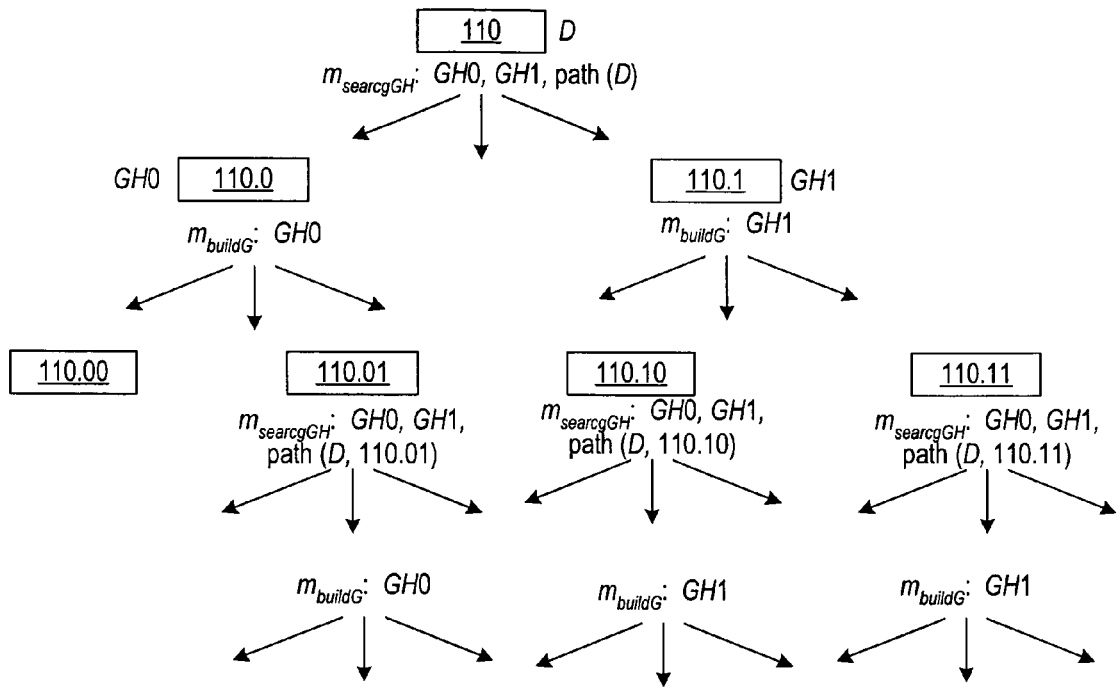
FIG. 10 is a block diagram showing data transmissions in determining the network paths according to some embodiments of the present invention.
Figure 11:
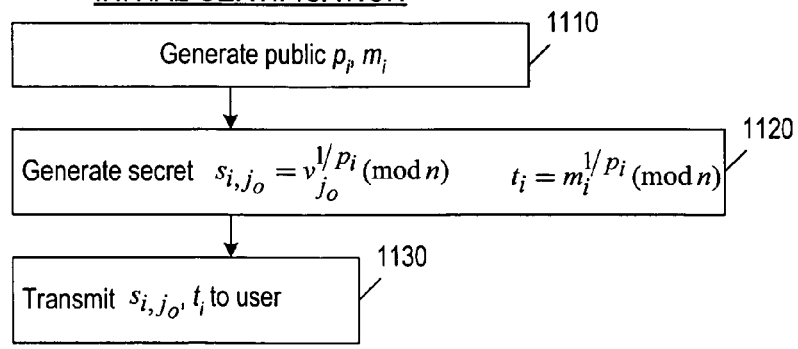
FIG. 11 is a flowchart of operations performed by a certification authority (CA) in initial certification according to some embodiments of the present invention.

At the beginning, there is only a single group PP of users which covers the whole network. Each recursion step is carried out in four phases as depicted in FIG. 9. The first recursion step is started by a node which is preferably located in the center of the network. We call this node the current designated node D. Node D executes the following four phases of recursion:

SEARCH GROUP HEADS (STATE 910): Node D selects randomly two nodes out of its group as group heads GH0 and GH1. (For the sake of illustration, assume that node GH0 is node 110.0 of FIG. 8 or 10, and node GH1 is node 110.1). Node D sends out a broadcast message $m_{searchGH}$ with its group ID, the addresses of GH0 and GH1, and a path variable containing D's address. All receiving nodes within the same group obtain a copy of the path and check if they are GH0 or GH1. If not, they add their address to the path variable in the message and forward it (broadcast it) once. The path variable provides each node with the path to D. FIG. 10 shows the messages $m_{searchGH}$ transmitted by nodes D, 110.01, 110.10, 110.11.

BUILD GROUP (STATE 920): If the receiver of $m_{searchGH}$ is either GH0 or GH1, it starts building a sub-group by broadcasting a message $m_{buildG}$ containing its address. If a receiver of $m_{buildG}$ which belongs to the same group hasn't already received a message from a group head and therefore, joined its sub-group, he joins the sub-group announced in $m_{buildG}$ and forwards the message once. FIG. 10 illustrates the $m_{buildG}$ messages broadcast by nodes GH0, GH1, 110.01, 110.10, 110.11, assuming that the node 110.01 received the $m_{buildG}$ message from GH0 first, and nodes 110.10, 110.11 received the $m_{buildG}$ message from GH1 first.

REPORT GROUP (STATE 930): After some prescribed amount of time, all members of both sub-groups start reporting their membership status to D. Therefore, they include their addresses together with their sub-group IDs 0 or 1 in the message $m_{reportG}$ and send it over the path obtained in phase 1 to D. To make the reporting more efficient, nodes which are more distant from D start the reporting first. Nodes on the path of $m_{reportG}$ add their sub-group membership information to the message and forward it according to the path to D. Nodes having forwarded a $m_{reportG}$ don't initiate a report themselves.

TRANSMIT ACCUMULATOR (STATE 940): After D has received all reports, it looks up the paths p0 to GH0 and p1 to GH1 included in the received reports, exponentiates the accumulator $v_j$ for its group to obtain the accumulators $v_j(0)$ and $v_j(1)$ for the respective sub-groups, and sends the accumulators in respective messages $m_{transmitu0}$ over p0 to GH0 and $m_{tranmitu1}$ over p1 to GH1, respectively. Additionally to the accumulators $v_j(0)$ and $v_j(1)$, these messages contain a list of the corresponding sub-group members. After reception of $m_{transmitu0}$ or $m_{transmitu1}$ respectively, GH0 and GH1 become designated nodes D of their sub-groups and enter phase 910 of the next recursion step. The recursion ends if the sub-group accumulator is a personal accumulator.

Considering a set of all users UU with cardinality $|UU|=2^R=t$, and equal distribution of each group PP into two groups of identical size |PP|/2, the recursion will end after R steps with a total number of t sub-groups of size 1. Here, we mention a few aspects of the scheme's computational and communication complexity, assuming that, at each step, the split is into approximately equal halves.

SEARCH GROUP HEADS: Within a subnetwork of size t', this step requires O(t') messages, each of size log t (since it requires log t bits on average to specify a single member of a group of t elements). Each message contains a path with average length $C_1\sqrt{t'}$. Therefore, communication for this sub-network is of O(t'$\sqrt{t'}$ log t). If we assume that the partitions are always equally-sized, the total communication of the entire recursive procedure is also O(t'$\sqrt{t'}$ log t).

BUILD GROUP: This step involves a total of t messages, each of constant size, for communication complexity O(t).

REPORT GROUP: Group membership information of the nodes is transmitted over $C_3*\sqrt{t}$ hops, where $C_3$ is a constant depending on the network density and reflecting the number of reports initiated: this results in communication of O(t'$\sqrt{t'}$ log t).

TRANSMIT ACCUMULATOR: Accumulators together with group membership information of t nodes is transmitted over $C_4*\sqrt{t}$ hops, where $C_4$ is a constant depending on the network density: this results in communication of O(t'$\sqrt{t'}$ log t) and computation of O(tR log t)=O(t $\log^2$ t).

Overall, the communication is O(t$\sqrt{t}$ log t) and the computation is O(t $\log^2$ t).

If we assume that there is an entity E of the network with less stringent limitations in terms of computational power and energy such as the certification authority itself, another interesting opportunity arises. By acquiring some topology knowledge this entity may pre-de-accumulate the accumulator into accumulators for constant size groups. In detail, such a scheme works as follows: Some node C which holds the current accumulator for all users and has connectivity to E initiates a distributed clustering algorithm of FIG. 9. In a second step, C provides the clustering information to E and lets E perform the pre-de-accumulation for all clusters. Then C distributes the accumulators to the clusters. Suitable clustering algorithms have communication complexity of O(t$\sqrt{t}$ log t), but perhaps with a smaller constant factor than the approach described above.

Briefly, we mention a distributed approach that splits a connected network into two connected subnetworks, where neither subnetwork is more than twice the size of the other. As before, we begin with a sub-network that has a designated node. We assume that the sub-network is connected, and that its topology is basically constant during the accumulator distribution (though it may change dramatically from period to period). The first step in the preferred algorithm for achieving O(t log t) communication and O(t log t) computation is that, in a distributed fashion, the nodes of the sub-network establish an enumeration of themselves. This can be accomplished as follows. The designated node initiates the procedure by broadcasting a message. The nodes that receive the message transmit an acknowledgement message back to the designated node, and they log the designated node as the node from which they received the message. The designated node logs the acknowledging nodes as the nodes that received its message. This process recurses throughout the network. Specifically, a node that received the message from the designated node broadcasts the message, and nodes that have not sent or received the message before log the identity of the node that they received the message from and they send back an acknowledgment, after which the sending node logs the acknowledgers. If a node receives the message more than once, it only logs and responds back to the first node that sent it. In this fashion, since the subnetwork is connected, every node in the subnetwork (except the designated node) has a unique node from which it received the message, as well as a list of the nodes that received the message directly from it. Each node that has a nonempty list of acknowledgers chooses an arbitrary enumeration of those acknowledgers. In effect, from this procedure, we have constructed a tree (a graph with no loops) from the network, as well as an enumeration of all of the tree nodes given by the depth-first pre-order traversal of the tree. If the subnetwork has t' nodes, this procedure can be accomplished with O(t') communication and computation.

The next stage of the algorithm is to use the enumeration to approximately bisect the subnetwork. There are a variety of different ways of doing this. One method is that each node, beginning with the nodes with no acknowledgers, could back-transmit (backwards according to the enumeration) the number of nodes in its subtree including itself; in this fashion, each node computes the number of nodes in its subtree. There must be exactly one node that has at least half of the nodes in its subtree, but such that none of its children have at least half. This node is designated to be the midpoint of the subnetwork. Now, viewing the midpoint point as the root of the tree, it divides its children into two groups, such that the number of nodes that are in a subtree emanating from one of the children in the first group is approximately equal to the number of nodes that are in a subtree emanating from one of the children in the second group. (This can always be accomplished such that ratio between the two numbers is at most two.) Thus, all of the network nodes except the midpoint become members of one of the two groups; the midpoint is considered to be a member of both groups. The step of computing how many nodes are in each subtree requires O(t' log t') communication, since there are t transmissions, where the size of each transmission (which is a number between 1 and t' representing how many nodes are in the given subtree) is log t' bits. Viewing the midpoint node as the root node, a new enumeration of the nodes is established with the midpoint node as the initiator of the message, beginning with the nodes in the first group. (This new enumeration could be computed as before, or it could actually be derived indirectly from the previous enumeration. Either way, it does not add to the asymptotic communication complexity of the protocol, which is t $\log^2$ t overall.)

Accumulator-Based Encryption of Validity Proofs

The personal accumulators $v_j(p_i)$ and/or the witness values $s_{i,j}$ (see e.g. equations (17), (20), (21), (26)) can be used to obtain symmetric keys that users can use to decrypt validation proofs under other validation systems. An example will now be given for the validation system obtained by combining the systems of FIGS. 2, 4-7, but this is not limiting.

INITIAL CERTIFICATION: When a user us joins the system, the CA:
1. Generates the validation and revocation seeds x, $N_0$ as in FIG. 2.
2. Generates all the tokens $c_j$ for all the periods j (see FIG. 2 and equation (1)).
3. Generates the certificate 140 as in FIG. 2 and transmits the certificate to the user $u_i$.
4. Performs the steps of FIG. 4, i.e. generates the values $p_i$, $m_i$, $s_{i,j_o}$ and transmits $s_{i,j_o}$ to the validity prover (which can be the user $u_i$ and/or the directories 210). The values $p_i$, $m_i$, can also be transmitted to the prover.
5. Generates all the witness values $s_{i,j}$ (for all the periods j) for the user $u_i$. Also generates the encryption keys $K_{i,j}$ each of which is $s_{i,j}$ or some function of $s_{i,j}$.
6. Encrypts each token $c_j$ (generated at step 2 in this procedure) with the encryption key $K_{i,j}$ under some encryption scheme (possibly a symmetric encryption scheme). Let us denote the encrypted $c_j$ value as $E_{i,j}$.
7. Transmits all the values $E_{i,j}$ (for all j) to the prover (i.e. the directories 210 and/or the certificate owner $u_i$).

RE-VALIDATION BY CA: At the start of, or shortly before, each period j, the CA:
1. Performs the procedure of FIG. 5, i.e. computes and broadcasts the accumulator value $v_j$ and the list of valid p numbers to the provers.
2. If the user $u_i$'s certificate is invalid, the CA transmits the revocation seed $N_0$ to the prover corresponding to the certificate (e.g. to the user $u_i$ and/or the directories 210).

PROOF DERIVATION BY THE PROVER: If the user $u_i$'s certificate is valid (as indicated by the transmission of number $p_i$ in the RE-VALIDATION procedure at step 1), the prover:
1. Performs the procedure of FIG. 6 to derive the witness value $s_{i,j}$.
2. Obtains the decryption key $K_{i,j}$ from $s_{i,j}$.
3. Decrypts $E_{i,j}$ to recover $c_j$.

AUTHENTICATION (VALIDITY PROOF): As in FIG. 2.

Many variations are possible. For example, the decryption keys can be some different function of $s_{i,j}$ than the encryption keys.

Accumulation of Revoked Certificates

Above, we have described an approach in which an accumulator accumulates the valid certificates; an alternative approach is to accumulate revoked certificates. The valid certificates' owners (or validity provers) then use the "dynamic" feature of dynamic accumulators to compute a new accumulator for the valid nodes, and to compute their personal accumulators with respect to this new accumulator.

As before, we will assume for the sake of illustration that each user operates a corresponding computer system 110 and owns at most one certificate 140. This is not limiting, as a user may own multiple certificates and/or operate multiple systems 110. The scheme is also applicable to controlling resource access and other kinds of authentication. We will use the word "user" to denote both the system 110 and the system's operator where no confusion arises. As described below, each user $u_i$ will be assigned a positive integer $p_i$ with the same properties as in the scheme of FIGS. 4-7 (e.g. $p_i$ are mutually prime relative to the CA's public composite modulus n and to each other). The symbols n, PP, $p_i$ will be as in the scheme of FIGS. 4-7. In particular, PP is the set of the $p_i$ numbers.

For each period j, the symbol $QQ_j$ will denote the set of the revoked $p_i$ numbers (i.e. the set of the $p_i$ numbers corresponding to the certificates to be declared as revoked in period j). $Q_j$ denotes the product of the numbers in $QQ_j$:

$$Q_j = \Pi_{p_k \in QQ_j} p_k \tag{36}$$

The symbol a will denote an accumulator seed, which is an integer mutually prime with the modulus n. The accumulator of the values in $Q_j$ is:

$$v_j = a^{1/Q_j} \bmod n \tag{37}$$

Let $RR_j = QQ_j - QQ_{j-1}$, i.e. $RR_j$ is the set of the p numbers corresponding to the certificates declared as revoked in period j but not in period j−1; in period j−1 these certificates were either declared as valid or were not yet part of the validation system. Let $R_j$ denote the product of the numbers in $RR_j$:

$$R_j = \Pi_{p_k \in RR_j} p_k \tag{38}$$

It is easy to see from (37) that if each certificate cannot be "unrevoked" (i.e. cannot be made valid once revoked), then:

$$v_j = v_{j-1}^{1/R_j} \bmod n \tag{39}$$

CA SET UP: The CA generates its modulus n and the accumulator seed a. The CA sets the initial accumulator value $v_j = a$ for the initial period j.

INITIAL CERTIFICATION (FIG. 1): Suppose a user $u_i$ wants to join the system in a period $j_o$, to be validated starting the next period $j_o+1$. At step 1110, CA 120 generates $p_i$, $m_i$ as at step 410 in FIG. 4. These numbers can be made part of the user's certificate 140 (FIG. 3). At step 1120, the CA computes the following secret numbers:

$$t_i = m_i^{1/p_i} \pmod{n} \tag{40}$$

$$s_{i,j_0} = v_{j_0}^{1/p_i} \pmod{n} \tag{41}$$

Here, $v_{j_o}$ is the accumulator value for the period $j_o$ ($v_{j_o}$=a if $QQ_{j_o}$ is empty). At step 1130, the CA transmits the values $t_i$, $s_{i,j_0}$ to the user $u_i$ in an encrypted form. As will be explained, the user will be able to derive the value $$s_{i,j} = v_j^{1/p_i} \pmod{n} \tag{42}$$

for each period $j > j_o$ for which the certificate is valid.

CERTIFICATE RE-VALIDATION (FIG. 12): In period j, suppose that $v_{j-1} \in Z/nZ$ is the accumulator value for period j−1. For validation in period j, the CA:
1. Computes $v_j$ (using the equation (37) or (39) for example);
2. Transmits the value $v_j$ together with a list of the newly-revoked certificates (perhaps represented by the set $RR_j$) to the users. If desired, the CA may also sign the pair ($v_j$,j) and transmit the signature to the users.

Figure 13:
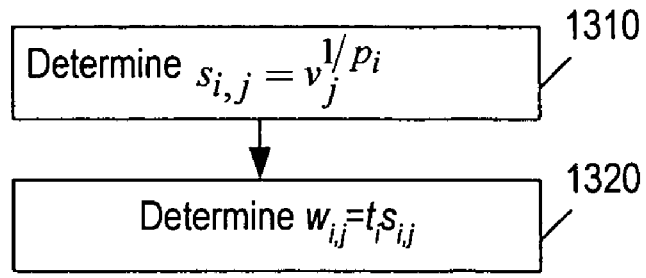
FIG. 13 is a flowchart of witness derivation operations according to some embodiments of the present invention.

WITNESS DERIVATION (FIG. 13): If a user $u_i$ is valid for the period j, then the user has the value $s_{i,j-1} = v_{j-1}^{1/p_i} \pmod{n}$. See (41), (42). At step 1310, the user computes $s_{i,j} = v_j^{1/p_i}$ as follows:
1. The user applies the Extended Euclidian Algorithm to compute integers a and b such that $$ap_i + bR_j = 1 \tag{43}$$

(this is possible because $p_i \notin RR_j$, so $p_i$ and $R_j$ are mutually prime).
2. The user sets $s_{i,j}$ to the value:

$$v_j^a s_{i,j-1}^b \bmod n \tag{44}$$

This value is indeed a $p_i$-th root of $v_j$ modulo n, because (note equation (39)):

$$(v_j^a s_{i,j-1}^b)^{p_i} = v_j^{ap_i} v_{j-1}^{\frac{1}{p_i} b p_i} = v_j^{ap_i} v_j^{R_j b} = v_j \bmod n$$

At step 1320, the user computes the witness $$w_{i,j} = t_i s_{i,j} \tag{45}$$

Figure 14:
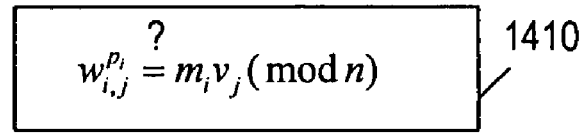
FIG. 14 is a flowchart of authentication according to some embodiments of the present invention.

USER AUTHENTICATION (FIG. 14): The user $u_i$ provides $t_i s_{i,j}$ (mod n) to the verifier, along with (if necessary) the values for ($u_i$, $p_i$, $j_0$, $w_i$). In addition, the user provides to the verifier the accumulator value $v_j$ and the CA's signature on ($v_j$,j). At step 1410, the verifier checks the CA's signature and confirms that:

$$w_{i,j}^{p_i} = m_i v_j \pmod{n} \tag{46}$$

ALTERNATIVE USER AUTHENTICATION: The authentication can be performed using the identity-based GQ signature scheme as described above in connection with equations (23), (24), using $w_{i,j}$ as a private key. The CA performs the functions of GQ's PKG (private key generator); GQ's parameters are set as follows: $B = w_{i,j}$, $v = p_i$, and $J = m_i^{-1}$ mod n. The authentication proceeds as follows:
  The verifier sends to the user a random message m.
  The user generates a random number r and computes:

$$d = H(m \| r^{p_i}), D = r w_{i,j}^d \pmod{n} \tag{47}$$

where H is some predefined public function. The user sends the values m, $m_i$, $r^{p_i}$, and D to the verifier.

The verifier computes $J = m_i^{-1}$ mod n and checks that the following equations hold:

$$d = H(m \| J^d D^{p_i})$$

$$J^d D^{p_i} = r^{p_i} v_j \pmod{n} \tag{48}$$

This scheme may reduce total bandwidth because the verifier does not need the certificate 140. Note: for the GQ signature scheme to be secure, it is desirable that $p_i > 2^{160}$.

The use of accumulator $v_j$ allows a user to revoke itself, without the CA's help. To revoke itself in a period j, user $u_i$ simply broadcasts $v_j^{1/p_i} \pmod{n}$, after which every other user $u_k$ can update the accumulator to be $v_j \leftarrow v_j^{1/p_i} \pmod{n}$ and can recompute its personal $s_{k,j}$ and $w_{k,j}$ values as in (43)-(45). Of note, $R_j$ can be re-computed by multiplying the previous $R_j$ value by $p_i$.

Figure 12:
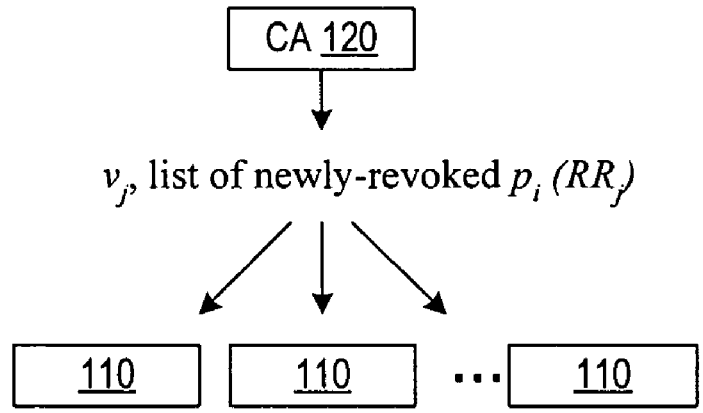
FIG. 12 is a block diagram illustrating certificate re-validation operations performed by a CA according to some embodiments of the present invention.

In some embodiments, this scheme allows efficient distribution (e.g. broadcast) for the CA at the stage of FIG. 12, since the CA transmits the same information to all the users. This information requires only O(t) transmissions. On the other hand, each transmission is proportional in size to the size of $RR_j$. Clients of the CA may include many users that are not in the particular t-member network that we are concerned about. If the "super-network" of clients of the CA is very large in proportion to t, this may not be a very good solution. Even if the CA only manages our t-member network, the CA's size of each transmission is still, strictly speaking, proportional to t, since the number of revocations within the network in a given period will tend to be a constant fraction of the total number of users. In this sense, the communication complexity of certificate distribution in this scheme is analogous to the communication complexity of a delta-CRL scheme. Recall that in a delta-CRL scheme, the CA transmits a list of users revoked in the given period, together with a signature on that list, to all users. On the other hand, since a personal accumulator's size is independent of the number of time periods, the scheme has better communication complexity for authentication than delta-CRLs, because in the delta-CRL scheme the verifier must separately check the delta-CRLs for all time periods to confirm that a given user has not been revoked during any of these periods.

The invention is not limited to the embodiments described above. The invention is not limited to secure or dynamic accumulators. An accumulator can be any data that accumulate some elements. Further, the invention is not limited to the accumulators described above. For example, the accumulator seed h(j)/h(j−1) in equation (17) can be replaced with a value independent of the period j, and the accumulator seed a in the accumulator (37) can be replaced with a function of j. The accumulator methods can be used to prove (authenticate) membership in a set or possession of some property. Examples include authentication of valid entitlements, or authentication of people as being members of some organization.

In some embodiments, the CA 120, the directories 210, and the systems 110 are computer systems communicating with each other over a network or networks. Each of these systems may itself be a computer system having components communicating over networks. Each computer system includes one or more computer processors executing computer instructions and manipulating computer data as described above. The term "data" includes "computer data" and covers both computer instructions and computer data manipulated by the instructions. The instructions and data can be stored on a data carrier such as a computer storage, i.e. a computer readable medium (e.g. a magnetic or optical disk, a semiconductor memory, and other types of media, known or to be invented).

The data carrier may include an electromagnetic carrier wave transmitted over a network, e.g. through space, via a cable, or by some other means. The instructions and data are operable to cause the computer to execute appropriate algorithms as described above.

The invention is not limited to any particular hash functions, or to cryptographic functions (which are easy to compute but are one-way or collision resistant). In some embodiments, it is desirable that a function f or H be collision resistant not in the sense that it is difficult to find different x and y with the same image but in the sense that if x and y are uniformly drawn from the function's domain, the probability is small that they both will have the same image:

$$P\{H(x)=H(y)\} \leq \alpha$$

where $\alpha$ is a small constant (e.g. $1/10$, or $1/100$, or $2^{-25}$, or $2^{-50}$, or $2^{-80}$, or $2^{-160}$, or some other value). Some or all of the techniques used for validity proofs can also be used for invalidity proofs and vice versa. The CA, the directories, and the systems 110 may include software-programmable or hard-wired computer systems interconnected via a network or networks. Each function f or H represents an evaluation method performed by a computer system. The invention is not limited to the step sequences shown in the flowcharts, as the step order is sometimes interchangeable and further different steps may be performed in parallel. Other embodiments and variations are within the scope of the invention, as defined by the appended claims.

REFERENCES

All of the following references are incorporated herein by reference.

[1] W. Aiello, S. Lodha, and R. Ostrovsky. Fast digital identity revocation. In *Proc. of CRYPTO '98*, 1998.

[2] G. Ateniese, J. Camenisch, M. Joye, and G. Tsudik. A Practical and Provably Secure Coalition-Resistant Group Signature Scheme. In *Proceedings of CRYPTO 2000*, 2000.

[3] M. Bellare and P. Rogaway. Random oracles are practical: A paradigm for designing efficient protocols. In *Proc. First Annual Conference on Computer and Communications Security*, ACM, 1993.

[4] D. Boneh, B. Lynn, and H. Shacham. Short signatures from the Weil pairing. In *Proceedings of Asiacrypt '01*, 2001.

[5] F. Elwailly and Z. Ramzan. QuasiModo: More Efficient Hash Tree-Based Certificate Revocation. Manuscript, 2003.

[6] I. Gassko, P. S. Gemmell, and P. MacKenzie. Efficient and fresh certification. In Proceedings of PKC 2000, 2000.

[7] S. Goldwasser, S. Micali, and R. L. Rivest. A Digital Signature Scheme Secure Against Adaptive Chosen-Message Attacks. SIAM Journal on Computing, 17(2):281-308, 1988.

[8] Y-C. Hu, A. Perrig, and D. Johnson. Efficient security mechanisms for routing protocols. In proceedings of the 10th Annual Network and Distributed System Security Symposium (NDSS), 2003.

[9] M. Jakobsson, J-P. Hubaux, and L. Buttyan. A micropayment scheme encouraging collaboration in multi-hop cellular networks. In *Proceedings of the 7th International Conference on Financial Cryptography*, 2003.

[10] M. Jakobsson, T. Leighton, S. Micali, and M. Szydlo. Fractal merkle tree representation and traversal. In *Proceedings of the Cryptographer's Track*, RSA Conference., 2003.

[11] S. Jarecki and A. Odlyzko. An efficient micropayment system based on probabilistic polling. In *Proceedings of the 1st International Conference on Financial Cryptography*, 1997.

[12] Robert Johnson, David Molnar, Dawn Xiaodong Song, and David Wagner. Homomorphic signature schemes. In CT-RSA, pages 244-262, 2002.

[13] C. Jutla and M. Yung. PayTree: Amortized signatures for flexible micropayments. In *Proceedings of the second USENIX workshop on electronic commerce*, 1996.

[14] S. Kim and H. Oh. An atomic micropayment system for a mobile computing environment. *IEICE Transactions of Information and Systems*, E84-D(6):709-716, 2001.

[15] P. Kocher. On Certificate Revocation and Validation. In *Proceedings of the 2nd International Conference on Financial Cryptography*, 1998.

[16] Satoshi Koga and Kouichi Sakurai. A distributed certificate status protocol with single public key. In *Proceedings of PKC* 2004, pages 389-401, 2004.

[17] R. J. Lipton and R. Ostrovsky. Micro-Payments via Efficient Coin Flipping. In *Proceedings of the 2nd International Conference on Financial Cryptography*, 1998.

[18] A. Malpani, R. Housely, and T. Freeman. Simple Certificate Validation Protocol—(SCVP). In *IETF Draft—draft-ietf-pkix-scvp-12.txt*, June 2003.

[19] R. C. Merkle. Protocols for Public-Key Cryptography. In *IEEE Symposium on Security and Privacy*, 1980.

[20] S. Micali. Efficient Certificate Revocation. MIT/LCS/TM 542b, Massachusetts Institute of Technology, 1996.

[21] S. Micali. Efficient Certificate Revocation. In *Proceedings of the RSA Data Security Conference*, 1997. Also U.S. Pat. No. 5,666,416.

[22] S. Micali. NOVOMODO: scalable certificate validation and simplified PKI management. In *Proceedings of the 1st Annual PKI Research Workshop*, 2002.

[23] M. Myers, R. Ankney, A. Malpani, S. Galperin, and C. Adams. X.509 internet public key infrastructure Online Certificate Status Protocol—OCSP. In *Internet RFC* 2560, June 1999.

[24] M. Naor and K. Nissim. Certificate Revocation and Certificate Update. In *Proceedings of USENIX Security*, 1998.

[25] National Bureau of Standards. NBS FIPS PUB 81: DES modes of operation. 1980.

[26] National Institute of Standards. FIPS 180-1: Secure hash standard. 1995.

[27] M. Pierce and D. O'Mahony. Micropayments for Mobile Networks. In *Proceedings of European Wireless*, 1999. Winner of Best Paper Award.

[28] R. L. Rivest. The MD5 message digest algorithm. In *Internet RFC* 1321, April 1992.

[29] R. L. Rivest. Electronic Lottery Tickets as Micropayments. In *Proceedings of the 2nd International Conference on Financial Cryptography*, 1997.

[30] R. L. Rivest and A. Shamir. PayWord and MicroMint—Two Simple Micropayment Schemes. *CryptoBytes (RSA Laboratories)*, 2(1), 1996. Proceedings of 1996 International Workshop on Security Protocols.

[31] R. L. Rivest, A. Shamir, and L. Adleman. A Method for Obtaining Digital Signatures and Public-Key Cryptosystems. *Communications of the ACM*, 21:120-126, 1978.

[32] Ron Steinfeld, Laurence Bull, and Yuliang Zheng. Content extraction signatures. In *Proceedings of the 4th International Conference Seoul on Information Security and Cryptology*, pages 285-304. Springer-Verlag, 2002.

[33] H. Tewari and D. O'Mahony. Multiparty Micropayments for Ad-Hoc Networks. In *Proceedings of the IEEE Wireless Communications and Networking Conference (WCNC)*, 2003.

[34] H. Tewari and D. O'Mahony. Real-Time Payments for Mobile IP. *IEEE Communications*, 41(2): 126-136, 2003.

[35] D. Wheeler. Transactions Using Bets. In *Proceedings of Fourth Cambridge Workshop on Security Protocols*, 1996.

[36] J. Zhou and K-Y. Lam. Undeniable Billing in Mobile Communication. In *Proceedings of MOBICOM*, 1998.

[37] M. Goodrich, R. Tamassia. An Efficient Dynamic and Distributed Cryptographic Accumulator. 2001.

[38] J. Benaloh and M. de Mare. One-Way Accumulators: A Decentralized Alternative to Digital Signatures.

[39] J. Camenisch and A. Lysyanskaya. Dynamic Accumulators and Application to Efficient Revocation of Anonymous Credentials. 2002.

[40] S. Gokhale and P. Dasgupta. Distributed Authentication for Peer-to-Peer Networks. Symposium on Applications and the Internet Workshops (SAINT'03 Workshops), 2003.

[41] O. Goldreich, S. Micali, A. Wigderson. Proofs that Yield Nothing But their Validity and a Methodology of Cryptographic Protocol Design. Extended Abstract, 27th FOCS, 1986 (IEEE).

[42] O. Goldreich and A. Kahan. How to Construct Constant-Round Zero-Knowledge Proof Systems for NP. Journal of Cryptology, Volume 9, No. 3, 1996, pages 167-190.

APPENDIX A

Accumulators and Proofs of Knowledge

Definition (Secure Accumulator). A secure accumulator for a family of inputs $\{XX_k\}$ is a family of families of functions $GG=\{FF_k\}$ with the following properties:

Efficient generation: There is an efficient probabilistic algorithm G that on input $1^k$ produces a random element f of $\{FF_k\}$. G also outputs some auxiliary information about f, denoted by $aux_f$.

Efficient evaluation: $f \in \{FF_k\}$ is a polynomial-size circuit that, on input $(u,x) \in UU_f \times XX_k$, outputs a value $v \in UU_f$, where $UU_f$ is an efficiently-samplable input domain for the function f and $\{XX_k\}$ is the intended input domain whose elements are to be accumulated.

Quasi-commutative: For all k, for all $f \in FF_k$, for all $u \in UU_f$, for all $x_1, x_2 \in XX_k$, $f(f(u,x_1),x_2)=f(f(u,x_2),x_1)$. If $X=\{x_1,\ldots,x_m\} \subset XX_k$, then by $f(u,X)$ we denote $f(f(\ldots(u,x_1),\ldots),x_m)$.

Witnesses: Let $v \in UU_f$ and $x \in XX_k$. A value $w \in UU_f$ is called a witness for x in v under f if $v=f(w,x)$.

Security: Let $UU'_f, XX'_k$ denote the domains for which the computational procedure for function $f \in FF_k$ is defined (thus $UU_f \subseteq UU'_f, XX_k \subseteq XX'_k$). For all probabilistic polynomial-time adversaries $A_k$, $Pr[f \leftarrow G(1^k); u \leftarrow UU_f(x,w,X) \leftarrow A_k(f,UU_f,u) X \subset XX_k;$
$w \in UU'_f; x \in XX'_k; x \notin X; f(w,x)=f(u,X)]$-neg(k).

Camenisch and Lysyanskaya ([39]) define the notion of a dynamic accumulator:

Definition (Dynamic Accumulator). A secure accumulator is dynamic if it has the following property:

Efficient Deletion: There exist efficient algorithms D and W such that, if $v=f(u,X)$, x, $x' \in X$, and $f(w,x)=v$, then:

$D(aux_f, v, x')=v'$ such that $v'=f(u, X-\{x'\})$ and $W(f,v,v',x,x')=w'$ such that $f(w',x)=v'$.

ZERO-KNOWLEDGE PROOFS. An advantage of accumulators (at least, RSA-based accumulators, which are described later) is that it is possible to construct efficient zero-knowledge proofs (ZK proofs) that a value has been accumulated. It has been proven that any statement that is in NP (nondeterministic polynomial-time) can be proven in ZK, but some statements can be proven in ZK much more efficiently than others. Briefly, we describe the concept of a ZK proof, which was introduced independently by Brassard, Chaum, and Crepeau and by Goldwasser, Micali, and Racko, and further refined by Bellare and Goldreich.

Let x be an input, and let R be a polynomially computable relation. Roughly speaking, a zero-knowledge proof of knowledge of a witness w such that $R(x,w)=1$ is a probabilistic polynomial-time protocol between a prover P and a verifier V such that, after the protocol, V is convinced that P knows such a witness w, but V does not obtain any explicit information about w. In other words, apart from "proving" that it knows a witness w such that $R(x,w)=1$, P imparts "zero knowledge" to V.

In the sequel, we may use the notation introduced by Camenisch and Stadler for various proofs of knowledge of discrete logarithms and proofs of the validity of statements about discrete logarithms. For instance, $PK\{(\alpha,\beta,\gamma): y=g^\alpha h^\beta \wedge y'=g'^\alpha h'^\gamma \wedge (u \leq \alpha \leq v)\}$ denotes a zero-knowledge Proof of Knowledge of integers $\alpha$, $\beta$, and $\gamma$ such that $y=g^\alpha h^\beta$ and $y'=g'^\alpha h'^\gamma$, where $u \leq \alpha \leq v$ and where g, g', h, h', y, and y' are elements of some groups $G=\langle g \rangle = \langle h \rangle$ and $G'=\langle g' \rangle = \langle h' \rangle$. The convention is that Greek letters denote quantities the knowledge of which is being proved, while all other parameters are known to the verifier. Using this notation, a proof-protocol can be described by just pointing out its aim while hiding all details.

Often, these proofs of knowledge are instantiated by a three-pass protocol, in which the prover first sends the verifier a commitment to certain values, after which the verifier sends the prover a challenge bit-strings, and the prover finally sends a response that incorporates both the "known value", the committed values and the challenge value in such a way that it convinces the verifier is convinced of the prover's knowledge.

These proofs of knowledge can be turned into signature schemes via the Fiat-Shamir heuristic. That is, the prover determines the challenge c by applying a collision-resistant hash function H to the commitment and the message m that is being signed and then computes the response as usual. We denote such signature proofs of knowledge by the notation, e.g., $SPK\{\alpha: y=f(\alpha)\}(m)$. Such SPK's can be proven secure in the random oracle model, given the security of the underlying proofs of knowledge.

ZK proofs are often accomplished with the help of a commitment scheme. A commitment scheme consists of the algorithms Commit and VerifyCommit with properties as follows. The commitment algorithm Commit takes as input a message m, a random string r and outputs a commitment C, i.e., $C=Commit(m,r)$. The (commitment) verification algorithm VerifyCommit takes as input (C,m,r) and outputs 1 (accept) if C is equal to Commit(m,r) and 0 (reject) otherwise. The security properties of a commitment scheme are as follows. The hiding property is that a commitment $C=Commit(m,r)$ contains no (computational) information on m. The binding property is that given C, m, and r, where $1=VerifyCommit(C,m,r)$, it is (computationally) impossible to find a message $m_0$ and a string $r_0$ such that $1=VerifyCommit(C,m_0,r_0)$.

To prove, in ZK, knowledge of a witness w of a value x that has been accumulated—i.e., that $f(w,x)=v$, where v is the accumulator value—the usual method is to choose a random string r and construct a commitment c=Commit(x, r) and then provide the following proof of knowledge:

$PK\{(\alpha,\beta,\gamma):c=Commit(\alpha,\gamma) \wedge f(\gamma,\alpha)=v\}.$ Above α represents the (hidden) x value, while β represents r and γ represents w.

RSA-BASED ACCUMULATORS. Here we describe a common concrete instantiation of accumulators, which uses mathematics related to the well-known RSA public-key cryptosystem, invented by Rivest, Shamir and Adleman in 1977. Above, our description focused on some RSA-based instantiation of accumulators, but this description should not be considered limiting; our accumulator-based certificate revocation schemes could be used with any type of accumulators. An accumulator structure has an advantage that its size does not depend on the number of accumulated elements. An RSA-based accumulator makes use of a composite integer n, called a modulus, that should be chosen in such a way that it is hard to factor. In some embodiments of the schemes defined above, the modulus is an RSA modulus, which is defined as follows:

Definition (RSA modulus). A 2 k-bit number n is called an RSA modulus if n=pq, where p and q are k-bit prime numbers.

Of course, one can choose n in a different way—e.g., as the product of three primes, or as the product of two primes of different sizes.

Definition (Euler totient function). Let n be an integer. The Euler totient function $\phi(n)$ is the cardinality of the group $Z_n^*$ (the multiplicative group of elements having an inverse in the ring $Z_n$ of the integers modulo n; $Z_n^*$ is the set of all elements mutually prime with n).

If n=pq is the product of two primes, then $\phi(n)=(p-1)(q-1)$.

The security of RSA-based accumulators is based on the following assumption.

Definition (Strong RSA Assumption) The strong RSA assumption is that it is "hard," on input an RSA modulus n and an element u∈$Z_n^*$, to compute values e>1 and v such that $v^e=u(mod\ n)$. By "hard", we mean that, for all polynomial-time circuit families $\{A_k\}$, there exists a negligible function neg(k) such that $Pr[n \leftarrow RSAmodulus(1^k); u \leftarrow Z_n^*; (v,e) \leftarrow A_k(n,u): v^e = u\ (mod\ n)] = neg(k),$ where RSAmodulus($1^k$) is an algorithm that generates an RSA modulus as the product of two random k-bit primes, and a negligible function neg(k) is a function such that for all polynomials p(k), there is a value $k_0$ such that $neg(k)<1/p(k)$ for all k>$k_0$. The tuple (n,u) generated as above, is called a general instance of the strong RSA problem.

Corollary 1. Under the strong RSA assumption, it is hard, on input a flexible RSA instance (n,u), to compute integers e>1 and v such that $v^e=u(mod\ n)$.

The most common concrete instantiation of accumulators is based on the above strong-RSA assumption. Roughly speaking, the idea is as follows: Given a fixed base u(mod n), one can compute an accumulator of values $x_1$ and $x_2$ (for example) as $v=u^{x_1 x_2}(mod\ n)$. To prove that $x_1$ (for example) has been accumulated, one can forward the witness $w=u^{x_2}$ (mod n) and a verifier can confirm that indeed $w^{x_1}(mod\ n)$.

Now, we relate the formal description of accumulators to the concrete RSA-based construction. A secure RSA-based accumulator for a family of inputs $X_k$ is a family of functions $FF_k$, where the particular function $f \in FF_k$ depends on what the modulus n is. For reasons that will become clear later, we assume that elements of $X_k$ are pairwise relatively prime integers. Then, $aux_f$ is the (secret) factorization of n. As alluded to above, given an initial accumulator value v', an additional value x is added to the accumulator by computing a new accumulator value $v=v'^x(mod\ n)$. Notice that the computational complexity of this algorithm is independent of the number of prior values that have been accumulated. The RSA-based accumulator possesses the quasi-commutative property; e.g., regardless of the order in which $x_1$ and $x_2$ are incorporated into an initial accumulator v', the result is $v=v'^{x_1 x_2}(mod\ n)$. Given an accumulator v(mod n), the witness that a value x has been accumulated is $w=v^{1/x}(mod\ n)$, which can readily be verified by confirming that $v=w^x(mod\ n)$. To reiterate, the security of the construction is based on the assumption that the strong RSA problem is infeasible to solve.

RSA-based accumulators can be made dynamic. Recall that an accumulator is dynamic if, given an accumulator v that accumulates values of the set X and given the secret information $aux_f$, one can "de-accumulate" a value x'∈X—i.e., compute a new accumulator v' that accumulates the values of the set X−{x'}. Moreover, given a witness w that a value x has been accumulated (with respect to accumulator v that accumulates members of the set X) and given the accumulator v' that only accumulates members of X−{x'}, one can compute a new witness w' for x with respect to the accumulator v'. Specifically, for RSA-based accumulators, one can use the factorization of n to de-accumulate x' by computing $v'=v^{1/x'}$ (mod n). And given a witness w for x with respect to v—i.e., $w^x=v(mod\ n)$—and given the value of v', one can compute a witness w' for x with respect to v'—i.e., $w'^x=v'=v'^{1/x'}$(mod n)→$w'=v'^{1/xx'}$ (mod n) as follows. Assuming that x and x' are relatively prime, one can compute integers (a,b) such that ax+bx'=1, by using the Extended Euclidean Algorithm. Then $w'=v'^a w^b=v^{a/x'}v^{b/x}=v^{(ax+bx')/xx'}=v^{1/xx'}$ (mod n). Notice that the computation of w' is efficient, and (after v' is computed) it doesn't require any secret knowledge (e.g., the factorization of n).

Given a witness w that a value x is accumulated (with respect to an accumulator v(mod n)), it also well-known in the art how to construct a ZK proof of knowledge of a pair (w,x) that satisfies $w^x=v(mod\ n)$ (that hides the values of both w and x from the verifier).

End of Appendix A

APPENDIX B

Guillou-Quisquater (GQ) ID-based Signature Scheme

SET-UP:

1. A public key generator (PKG, a trusted party), publishes its public key (v,n) where n=$q_1 q_2$ (a product of two primes) is such that its factorization is hard to find, and v is a prime less than $\phi(n)=(p-1)(q-1)$.

2. For a user with an identity ID (e.g., an email address), the PKG computes the secret signing key B such that $JB^v \equiv 1\ mod\ n$, where J=R (ID), where R is a predefined public function, e.g. a redundancy function. In some embodiments, the function R maps ID into an element of $Z_n$. The function R is such that the number of elements in $Z_n$ that correspond to mappings from valid ID's is small. The PKG sends B to the user via a secure channel (e.g. encrypted).

SIGNING: To sign a message M, the user:

1. Computes J=R(ID)
2. Generates a random number r and computes $$d=H(M\|r^v), D=rB^d \qquad \text{(B-1)}$$

where H is a predefined public function (e.g. a hash function).

3. Sends the values M, $r^v$, d, D to the verifier.

VERIFICATION: The verifier:

1. Computes J=R(ID);
2. Checks that $d=H(M\|r^v)$;
3. Checks that $J^d D^v = r^v$.

End of Appendix B

The invention claimed is:

1. A computer-implemented authentication method for providing authentication for a plurality of elements as possessing a pre-specified property, wherein for each time period j of a plurality of successive time periods, the authentication is to be provided for each said element which possesses the pre-specified property, each element being operable to acquire the property and/or to lose the property in each of the successive time periods j, each element being associated with a distinct integer greater than 1, the method comprising, for at least one element E1 which is one of said elements, performing a set-up operation for the authentication, the set-up operation comprising:
   a first computer system generating the distinct integer $p_{E1}$ associated with the element E1;
   the first computer system obtaining data representing a $p_{E1}$-th root of a base number modulo a predefined composite integer whose factorization is a secret of the first computer system;
   the first computer system providing said data to a second computer system to enable the second computer system to prove that the element E1 possesses the pre-specified property;
   wherein for each said period j for which the element E1 is to be authenticated as possessing said property, the authentication is to be performed by operations comprising:
   the second computer system obtaining data representing an accumulator value which accumulates all the entities in a set $P1_j$ which is either (i) a set of the entities certified as possessing the pre-specified property in the period j, or (ii) a set of the entities certified as not possessing the pre-specified property in the period j;
   the second computer system combining the accumulator value with a value dependent on said $p_{E1}$-th root of the base number to obtain a witness value which is a $p_{E1}$-th root, modulo said composite integer, of a first value dependent on the base number and the accumulator value, the authentication comprising verifying that the $p_{E1}$-th power of the witness value equals the first value.

2. The method of claim 1 wherein the elements are either (a) digital certificates each of which certifies that a cryptographic key is associated with an entity, or (b) entitlements to use one or more resources, and
   said property is validity of a digital certificate or an entitlement.

3. A computer system comprising one or more computer processors, the computer system comprising one or more non-transitory computer-readable storage media comprising computer instructions operable to cause the computer system to perform the method of claim 1.

4. A manufacture comprising one or more non-transitory computer-readable media storing computer instructions for adapting a computer system to perform the method of claim 1.

5. The method of claim 1 wherein in the authentication, the first value is made available to a verifier together with the witness value or a proof of knowledge of the witness value.

6. The method of claim 5 further comprising the authentication operations for at least one said time period j.

7. The method of claim 1 wherein the accumulator value is a $P_j$-th root $u^{1/P_j}$(mod n) of an integer u modulo said predefined composite integer, where $P_j$ is the product of the distinct integers associated with the members of the set $P1_j$, where u is a constant or is a predefined function of the period of time.

8. The method of claim 1 wherein said verifying, that the $p_{E1}$-th power of the witness value equals the first value, is performed by a verifier computer system, and the $p_{E1}$-th root of the base number is a secret not provided to the verifier computer system.

* * * * *

UNITED STATES PATENT AND TRADEMARK OFFICE
CERTIFICATE OF CORRECTION

PATENT NO. : 7,747,857 B2
APPLICATION NO. : 11/454394
DATED : June 29, 2010
INVENTOR(S) : Zulfikar Amin Ramzan Page 1 of 1

It is certified that error appears in the above-identified patent and that said Letters Patent is hereby corrected as shown below:

Column 27, line 45, "entities" should read --elements--.

Column 28, line 1, "entities" should read --elements--.

Column 28, line 3, "entities" should read --elements--.

Signed and Sealed this
Fifth Day of June, 2012

David J. Kappos
*Director of the United States Patent and Trademark Office*